US012464512B2

(12) United States Patent
Zorgui et al.

(10) Patent No.: US 12,464,512 B2
(45) Date of Patent: Nov. 4, 2025

(54) SEMI-PERSISTENTLY SCHEDULED RATE-SPLITTING COMMUNICATIONS

(71) Applicant: QUALCOMM Incorporated, San Diego, CA (US)

(72) Inventors: Marwen Zorgui, San Diego, CA (US); Ahmed Attia Abotabl, San Diego, CA (US); Ahmed Elshafie, San Diego, CA (US); Wanshi Chen, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 532 days.

(21) Appl. No.: 18/060,397

(22) Filed: Nov. 30, 2022

(65) Prior Publication Data

US 2024/0179696 A1    May 30, 2024

(51) Int. Cl.
*H04W 72/11*    (2023.01)
*H04W 72/0446*    (2023.01)
*H04W 72/0453*    (2023.01)
*H04W 72/566*    (2023.01)

(52) U.S. Cl.
CPC ........ *H04W 72/11* (2023.01); *H04W 72/0446* (2013.01); *H04W 72/0453* (2013.01); *H04W 72/566* (2023.01)

(58) Field of Classification Search
CPC ............. H04W 72/11; H04W 72/0446; H04W 72/0453; H04W 72/566; H04W 72/23
See application file for complete search history.

(56) References Cited

U.S. PATENT DOCUMENTS

2019/0116605 A1\*   4/2019   Luo ................... H04W 72/0446
2019/0320437 A1\*   10/2019   Gupta ................... H04W 72/20
2021/0352701 A1\*   11/2021   Taherzadeh Boroujeni ................
                                                                    H04W 72/23

\* cited by examiner

*Primary Examiner* — Ricky Q Ngo
*Assistant Examiner* — Kabir U Jahangir
(74) *Attorney, Agent, or Firm* — Holland & Hart LLP

(57) ABSTRACT

Methods, systems, and devices for wireless communications are described. Generally, the proposed techniques provide for a semi-persistent design for communicating rate-split messages from a network entity to multiple user equipments (UEs). The network entity may transmit control information to one or more UEs indicating encoding information for receipt of one or more downlink messages to be communicated during respective downlink occasions, which may be configured for rate-split communications. Thus, a first UE may be made aware of one or more semi-persistent downlink occasions via which respective downlink messages (e.g., respective to each downlink occasion) are to be encoded into a common portion and a private portion. In some cases, the common portion may be common with other downlink messages (e.g., intended for other UEs) and the private portion may be specific to the first UE. The first UE may then decode the rate-split downlink messages according to the encoding information.

30 Claims, 15 Drawing Sheets

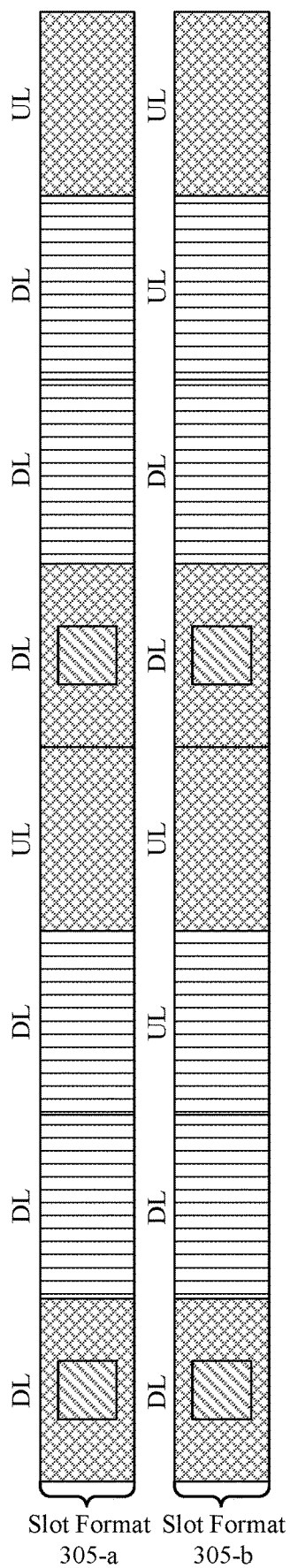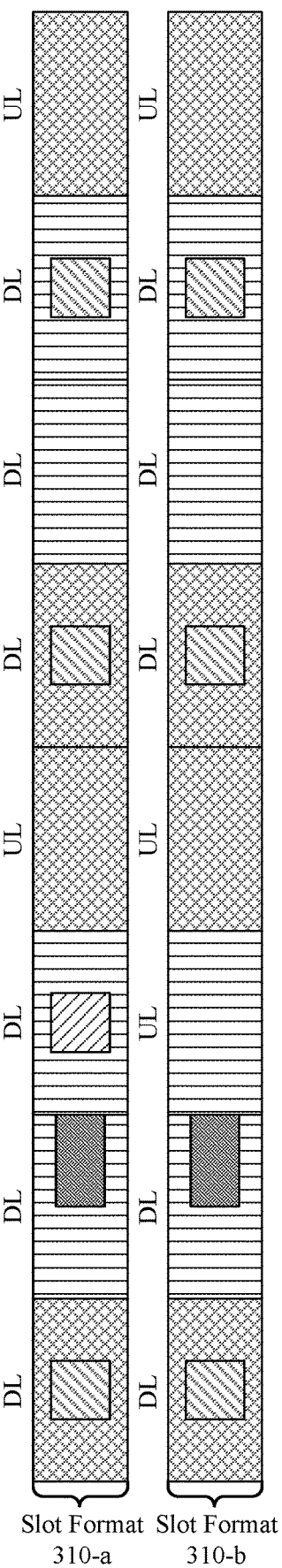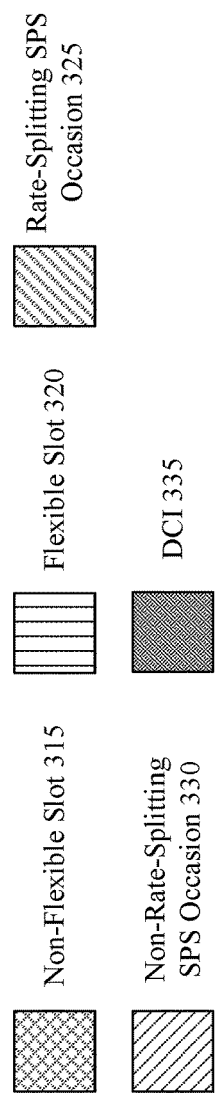
FIG. 3A
FIG. 3B

SEMI-PERSISTENTLY SCHEDULED RATE-SPLITTING COMMUNICATIONS

FIELD OF TECHNOLOGY

The following relates to wireless communications, including semi-persistently scheduled rate-splitting communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations, each supporting wireless communication for communication devices, which may be known as user equipment (UE). In some wireless communications systems, a network entity may communicate with multiple UEs according to a rate-splitting design. Such rate-splitting techniques may be enhanced and may improve a capacity of a wireless channel.

SUMMARY

The described techniques relate to improved methods, systems, devices, and apparatuses that support semi-persistently scheduled rate-splitting communications. For example, the described techniques provide for a semi-persistent design for communicating rate-split messages from a network entity to one or more user equipments (UEs). The network entity may transmit control information (e.g., a downlink control information (DCI) message) to one or more UEs indicating encoding information for receipt of one or more downlink messages to be communicated during respective downlink occasions configured for rate-split communications. That is, a first UE may be made aware that one or more semi-persistent downlink occasions via respective downlink messages (e.g., respective to each downlink occasion) are to be encoded into a common portion and a private portion. In some cases, the common portion may be common with other downlink messages (e.g., intended for other UEs) and the private portion may be specific to the first UE. The UE may then decode the downlink messages according to the encoding information. In some examples, the network entity may schedule the one or more downlink occasions to occur at non-flexible slots (e.g., slots configured for a dedicated communication direction). In some other examples, the network entity may schedule the one or more downlink occasions to occur at both non-flexible slots and flexible slots (e.g., slots configured to have a variable communication direction).

A method for wireless communication at a first UE is described. The method may include receiving control information that schedules the first UE to receive semi-persistent communications over a set of multiple downlink occasions, the control information including encoding information for receipt, during at least one of the set of multiple downlink occasions, of a first downlink message that is encoded into a common portion and a first private portion, where the common portion is common with other downlink messages directed to other UEs and the first private portion is specific to the first UE and receiving, via at least one of the set of multiple downlink occasions and in accordance with the control information, the common portion and a set of multiple private portions, where the set of multiple private portions includes the first private portion and one or more other private portions corresponding to the other UEs.

An apparatus for wireless communication at a first UE is described. The apparatus may include a processor, memory coupled with the processor, and instructions stored in the memory. The instructions may be executable by the processor to cause the apparatus to receive control information that schedules the first UE to receive semi-persistent communications over a set of multiple downlink occasions, the control information including encoding information for receipt, during at least one of the set of multiple downlink occasions, of a first downlink message that is encoded into a common portion and a first private portion, where the common portion is common with other downlink messages directed to other UEs and the first private portion is specific to the first UE and receive, via at least one of the set of multiple downlink occasions and in accordance with the control information, the common portion and a set of multiple private portions, where the set of multiple private portions includes the first private portion and one or more other private portions corresponding to the other UEs.

Another apparatus for wireless communication at a first UE is described. The apparatus may include means for receiving control information that schedules the first UE to receive semi-persistent communications over a set of multiple downlink occasions, the control information including encoding information for receipt, during at least one of the set of multiple downlink occasions, of a first downlink message that is encoded into a common portion and a first private portion, where the common portion is common with other downlink messages directed to other UEs and the first private portion is specific to the first UE and means for receiving, via at least one of the set of multiple downlink occasions and in accordance with the control information, the common portion and a set of multiple private portions, where the set of multiple private portions includes the first private portion and one or more other private portions corresponding to the other UEs.

A non-transitory computer-readable medium storing code for wireless communication at a first UE is described. The code may include instructions executable by a processor to receive control information that schedules the first UE to receive semi-persistent communications over a set of multiple downlink occasions, the control information including encoding information for receipt, during at least one of the set of multiple downlink occasions, of a first downlink message that is encoded into a common portion and a first private portion, where the common portion is common with other downlink messages directed to other UEs and the first private portion is specific to the first UE and receive, via at least one of the set of multiple downlink occasions and in accordance with the control information, the common portion and a set of multiple private portions, where the set of multiple private portions includes the first private portion and one or more other private portions corresponding to the other UEs.

In some examples of the method, apparatuses, and non-transitory computer-readable medium described herein, the control information includes fallback transmission parameters and the method, apparatuses, and non-transitory computer-readable medium may include further operations, features, means, or instructions for receiving a DCI message indicating that one or more downlink occasions of the set of multiple downlink occasions may be to be dropped by the first UE, where the DCI message may be received based on a first priority level of communications with at least a second UE of the other UEs being higher than a second priority level of the semi-persistent communications, receiving, via the one or more downlink occasions, one or more subsequent downlink messages, and decoding the one or more subsequent downlink messages in accordance with the fallback transmission parameters.

In some examples of the method, apparatuses, and non-transitory computer-readable medium described herein, the control information may include operations, features, means, or instructions for a time domain resource allocation for one or more downlink messages, a frequency domain resource allocation for the one or more downlink messages, a periodicity of the one or more downlink messages, a modulation and coding scheme (MCS) for the one or more downlink messages, or any combination thereof, where each downlink message of the one or more downlink messages includes a respective common portion and a respective set of multiple private portions.

In some examples of the method, apparatuses, and non-transitory computer-readable medium described herein, each downlink occasion of a first subset of the set of multiple downlink occasions corresponds to a respective non-flexible slot of a set of multiple non-flexible slots and each downlink occasion of a second subset of the set of multiple downlink occasions corresponds to a respective flexible slot of a set of multiple flexible slots and the set of multiple non-flexible slots may be common to the first UE and the other UEs.

Some examples of the method, apparatuses, and non-transitory computer-readable medium described herein may further include operations, features, means, or instructions for receiving a DCI message including a slot format indicator (SFI), identifying, based on one or more bits included in the DCI message, that the first UE, a second UE of the other UEs, or both, may be to modify a communication direction of one or more flexible slots, and receiving one or more downlink messages via the one or more flexible slots, where the one or more downlink messages may be received in accordance with one or more non-rate-splitting parameters.

Some examples of the method, apparatuses, and non-transitory computer-readable medium described herein may further include operations, features, means, or instructions for receiving a DCI message that indicates that, for one or more subsequent downlink occasions, the first UE may be to decode one or more corresponding downlink messages in accordance with non-rate-splitting parameters.

In some examples of the method, apparatuses, and non-transitory computer-readable medium described herein, the encoding information may be associated with rate-splitting of a set of multiple downlink messages for corresponding ones of the first UE and the other UEs and the set of multiple downlink messages include the first downlink message.

In some examples of the method, apparatuses, and non-transitory computer-readable medium described herein, each downlink occasion of the set of multiple downlink occasions corresponds to a respective non-flexible slot of a set of multiple non-flexible slots and the set of multiple non-flexible slots may be common to the first UE and the other UEs.

In some examples of the method, apparatuses, and non-transitory computer-readable medium described herein, receiving the control information may include operations, features, means, or instructions for receiving the control information via a multicast message for the first UE and at least a second UE of the other UEs and receiving the control information via a unicast message specific to the first UE.

In some examples of the method, apparatuses, and non-transitory computer-readable medium described herein, receiving the common portion and the set of multiple private portions may include operations, features, means, or instructions for receiving an activation message after reception of the control information, the activation message activating the semi-persistent communications.

In some examples of the method, apparatuses, and non-transitory computer-readable medium described herein, the activation message may include operations, features, means, or instructions for a medium access control (MAC) control element (MAC-CE), where the MAC-CE may be addressed to the first UE and at least the second UE and a DCI message that may be addressed to the first UE and at least the second UE in accordance with a common radio network temporary identifier (RNTI).

A method is described. The method may include transmitting control information that schedules a set of multiple UEs to receive semi-persistent communications over a set of multiple downlink occasions, the control information including encoding information for receipt, by a first UE of the set of multiple UEs and during at least one of the set of multiple downlink occasions, of a first downlink message that is encoded into a common portion and a first private portion, where the common portion is common with downlink messages directed to other UEs of the set of multiple UEs and the first private portion is specific to the first UE and transmitting, via at least one of the set of multiple downlink occasions and in accordance with the control information, the common portion and a set of multiple private portions, where the set of multiple private portions includes the first private portion and one or more other private portions corresponding to the other UEs.

An apparatus is described. The apparatus may include a processor, memory coupled with the processor, and instructions stored in the memory. The instructions may be executable by the processor to cause the apparatus to transmit control information that schedules a set of multiple UEs to receive semi-persistent communications over a set of multiple downlink occasions, the control information including encoding information for receipt, by a first UE of the set of multiple UEs and during at least one of the set of multiple downlink occasions, of a first downlink message that is encoded into a common portion and a first private portion, where the common portion is common with downlink messages directed to other UEs of the set of multiple UEs and the first private portion is specific to the first UE and transmit, via at least one of the set of multiple downlink occasions and in accordance with the control information, the common portion and a set of multiple private portions, where the set of multiple private portions includes the first private portion and one or more other private portions corresponding to the other UEs.

Another apparatus is described. The apparatus may include means for transmitting control information that schedules a set of multiple UEs to receive semi-persistent communications over a set of multiple downlink occasions, the control information including encoding information for receipt, by a first UE of the set of multiple UEs and during at least one of the set of multiple downlink occasions, of a first downlink message that is encoded into a common portion and a first private portion, where the common portion is common with downlink messages directed to other UEs of the set of multiple UEs and the first private portion is specific to the first UE and means for transmitting, via at least one of the set of multiple downlink occasions and in accordance with the control information, the common portion and a set of multiple private portions, where the set of multiple private portions includes the first private portion and one or more other private portions corresponding to the other UEs.

A non-transitory computer-readable medium storing code is described. The code may include instructions executable by a processor to transmit control information that schedules a set of multiple UEs to receive semi-persistent communications over a set of multiple downlink occasions, the control information including encoding information for receipt, by a first UE of the set of multiple UEs and during at least one of the set of multiple downlink occasions, of a first downlink message that is encoded into a common portion and a first private portion, where the common portion is common with downlink messages directed to other UEs of the set of multiple UEs and the first private portion is specific to the first UE and transmit, via at least one of the set of multiple downlink occasions and in accordance with the control information, the common portion and a set of multiple private portions, where the set of multiple private portions includes the first private portion and one or more other private portions corresponding to the other UEs.

In some examples of the method, apparatuses, and non-transitory computer-readable medium described herein, the control information includes fallback transmission parameters and the method, apparatuses, and non-transitory computer-readable medium may include further operations, features, means, or instructions for transmitting, to the first UE, a DCI message indicating that one or more downlink occasions of the set of multiple downlink occasions may be to be dropped by the first UE, where the DCI message may be received based on a first priority level of communications with at least a second UE of the other UEs being higher than a second priority level of the semi-persistent communications and transmitting, via the one or more downlink occasions, one or more subsequent downlink messages.

In some examples of the method, apparatuses, and non-transitory computer-readable medium described herein, the control information may include operations, features, means, or instructions for a time domain resource allocation for one or more downlink messages, a frequency domain resource allocation for the one or more downlink messages, a periodicity of the one or more downlink messages, a MCS for the one or more downlink messages, or any combination thereof, where each downlink message of the one or more downlink messages includes a respective common portion and a respective set of multiple private portions.

In some examples of the method, apparatuses, and non-transitory computer-readable medium described herein, each downlink occasion of a first subset of the set of multiple downlink occasions corresponds to a respective non-flexible slot of a set of multiple non-flexible slots and each downlink occasion of a second subset of the set of multiple downlink occasions corresponds to a respective flexible slot of a set of multiple flexible slots and the set of multiple non-flexible slots may be common to the first UE and the other UEs.

Some examples of the method, apparatuses, and non-transitory computer-readable medium described herein may further include operations, features, means, or instructions for transmitting a DCI message including a SFI and further including one or more bits indicating that the first UE, a second UE of the other UEs, or both, may be to modify a communication direction of one or more flexible slots and transmitting one or more downlink messages via the one or more flexible slots, where the downlink messages may be transmitted in accordance with one or more non-rate-splitting parameters.

Some examples of the method, apparatuses, and non-transitory computer-readable medium described herein may further include operations, features, means, or instructions for transmitting a DCI message that indicates that, for one or more subsequent downlink occasions, the first UE may be to decode one or more corresponding downlink messages in accordance with non-rate-splitting parameters.

In some examples of the method, apparatuses, and non-transitory computer-readable medium described herein, the encoding information may be associated with rate-splitting of a set of multiple downlink messages for corresponding ones of the first UE and the other UEs and the set of multiple downlink messages include the first downlink message.

In some examples of the method, apparatuses, and non-transitory computer-readable medium described herein, each downlink occasion of the set of multiple downlink occasions corresponds to a respective non-flexible slot of a set of multiple non-flexible slots and the set of multiple non-flexible slots may be common to the first UE and the other UEs.

In some examples of the method, apparatuses, and non-transitory computer-readable medium described herein, transmitting the control information may include operations, features, means, or instructions for transmitting the control information via a multicast message for the first UE and at least a second UE of the other UEs and transmitting the control information via a unicast message specific to the first UE, one or more unicast messages specific to a respective UE of the other UEs, or both.

In some examples of the method, apparatuses, and non-transitory computer-readable medium described herein, transmitting the common portion and the set of multiple private portions may include operations, features, means, or instructions for transmitting an activation message after reception of the control information, the activation message activating the semi-persistent communications.

In some examples of the method, apparatuses, and non-transitory computer-readable medium described herein, the activation message may include operations, features, means, or instructions for a MAC-CE, where the MAC-CE may be addressed to the first UE and at least the second UE and a DCI message that may be addressed to the first UE and at least the second UE in accordance with a common RNTI.

BRIEF DESCRIPTION OF THE DRAWINGS

FIGS. 3A and 3B illustrate examples of slot diagrams that support semi-persistently scheduled rate-splitting communications in accordance with one or more aspects of the present disclosure.

DETAILED DESCRIPTION

In some wireless communications systems, a network entity may communicate with multiple user equipment (UEs) over a wireless network. To support such communications, the network entity may employ rate-splitting for multiple-user (MU) multiple-in multiple-out (MIMO) transmissions. For instance, the network entity may partition a downlink message into a common portion and a private portion such that the private portion is specific to a respective UE and the common portion is shared with multiple downlink messages for other UEs. Such techniques (e.g., rate splitting) may improve wireless channel characteristics, such as a capacity of the wireless channel. In some cases, the network entity may communicate rate-split downlink messages with two UEs which share common messages relatively frequently. In such cases, the frequency of rate-split downlink messages may incur significant amounts of signaling. For example, the network entity may transmit, to each UE, a downlink control information (DCI) message to indicate each rate-splitting physical downlink shared channel (PDSCH) occasion. Thus, an increased frequency of rate-splitting PDSCH occasions may be related to (e.g., proportional to) signaling overhead.

To facilitate communications involving frequent rate-splitting downlink occasions, a network entity may establish a semi-persistently scheduled (SPS) rate-splitting configuration. That is, the network entity may transmit control information to one or more UEs indicating downlink occasions via which the one or more UEs may expect to receive rate-split messages. By notifying a UE of the occasions via which rate-split messages are expected to be received, the UE may appropriately decode the rate-split messages. The network entity may configure SPS rate-splitting for non-flexible slots (e.g., slots with a defined communication direction in time domain duplexing (TDD)), or may configure SPS rate-splitting for both flexible slots and non-flexible slots. In some examples, such as when SPS rate-splitting is configured for both flexible slots and non-flexible slots, the network entity may identify downlink occasions configured for SPS rate-splitting where at least one UE is scheduled to communicate high-priority data, and may signal other UEs to drop upcoming transmissions, decode data using fallback transmission parameters, or both. Usage of an SPS rate-splitting configuration may reduce signaling overhead, as the network entity may indicate multiple rate-splitting downlink occasions using fewer messages.

Aspects of the disclosure are initially described in the context of wireless communications systems. Aspects of the disclosure are further illustrated by and described with reference to slot diagrams and process flows. Aspects of the disclosure are further illustrated by and described with reference to apparatus diagrams, system diagrams, and flowcharts that relate to semi-persistently scheduled rate-splitting communications.

Figure 1:
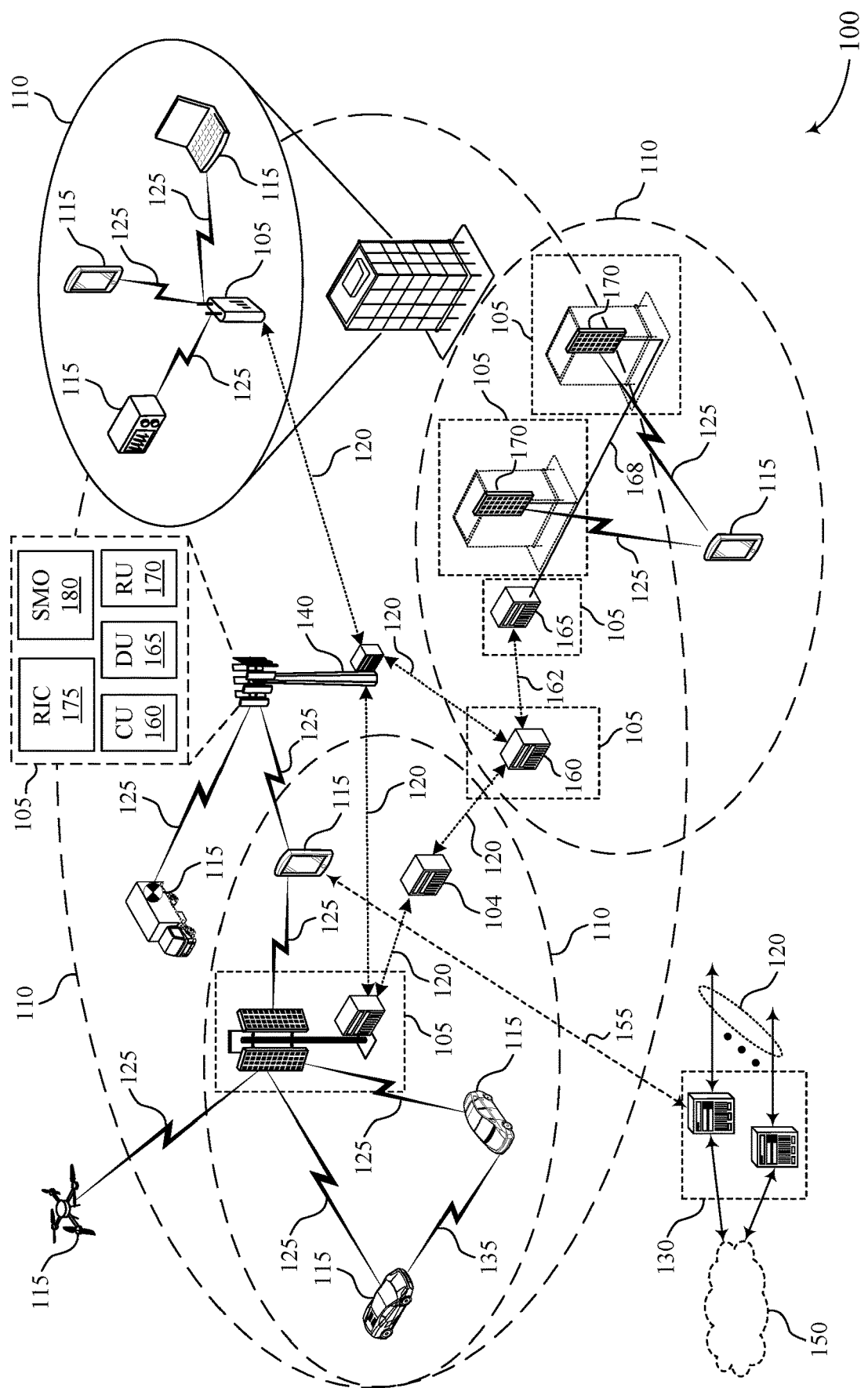
FIG. 1 illustrates an example of a wireless communications system that supports semi-persistently scheduled rate-splitting communications in accordance with one or more aspects of the present disclosure.

FIG. 1 illustrates an example of a wireless communications system 100 that supports semi-persistently scheduled rate-splitting communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support semi-persistently scheduled rate-splitting communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some wireless communications systems, such as the wireless communications system 100, a network entity 105 may establish a semi-persistent design for communicating rate-split messages from a network entity 105 to multiple UEs 115. The network entity 105 may transmit control information (e.g., a DCI message) to one or more UEs 115 indicating encoding information for receipt of one or more downlink messages to be communicated during respective downlink occasions configured for rate-split communications. That is, a first UE 115 may identify one or more semi-persistent downlink occasions via which respective downlink messages (e.g., respective to each downlink occasion) are to be encoded into a common portion and a private portion. In some cases, the common portion may be common with other downlink messages (e.g., intended for other UEs 115) and the private portion may be specific to the first UE 115.

The first UE 115 may then decode the downlink messages according to the encoding information. In some examples, the network entity 105 may schedule the one or more downlink occasions to occur at non-flexible slots (e.g., slots configured for a dedicated communication direction). In some other examples, the network entity 105 may schedule the one or more downlink occasions to occur at both non-flexible slots and flexible slots (e.g., slots configured to have a variable communication direction). Additionally, or alternatively, the network entity 105 may transmit signaling indicating that a UE 115 is to drop one or more of the rate-splitting downlink occasions, such as when one of the UEs 115 is scheduled to receive high-priority data during the one or more rate-splitting occasions or when a slot format is modified for a slot corresponding to the one or more downlink occasions.

Figure 2:
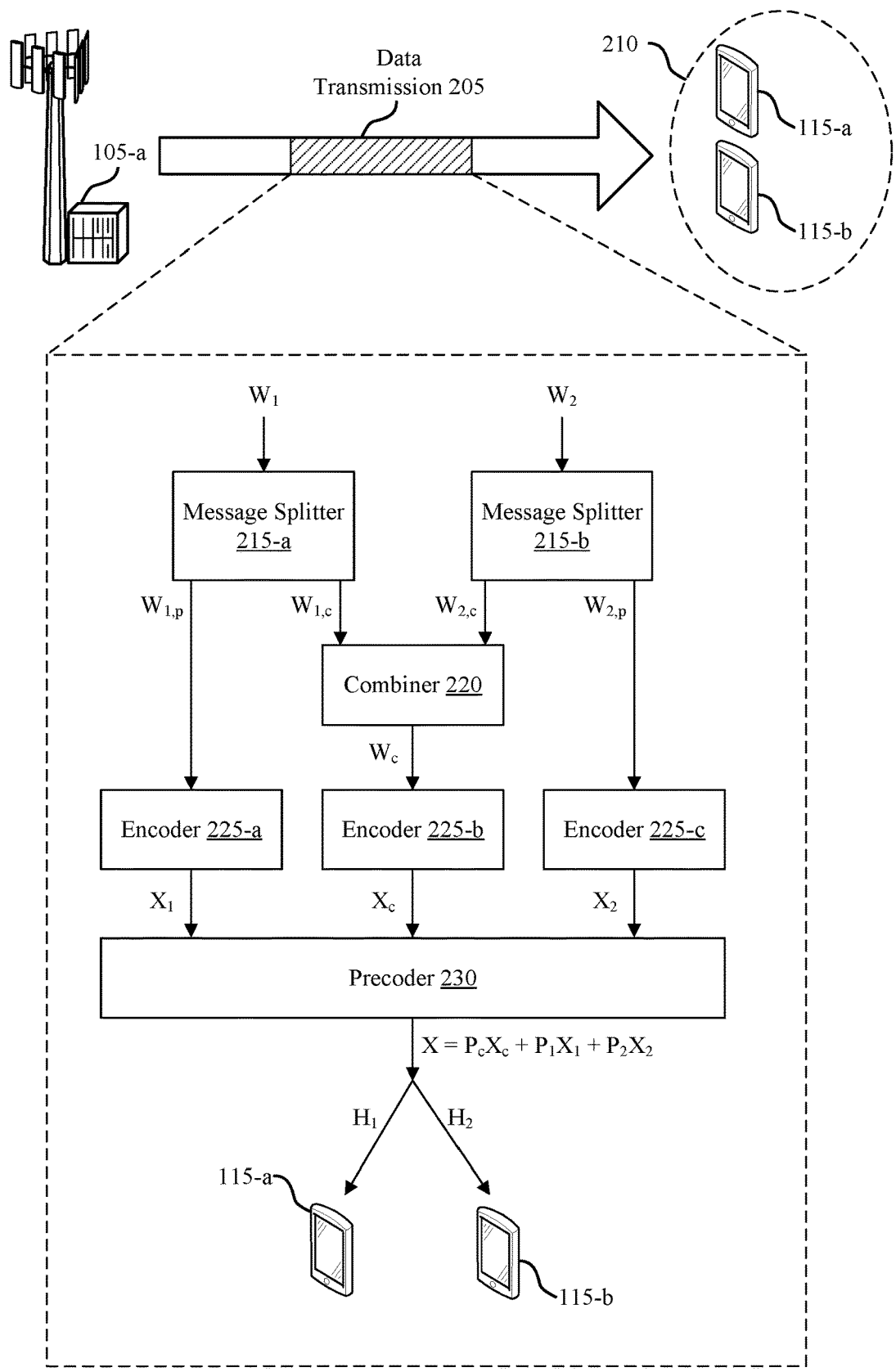
FIG. 2 illustrates an example of a wireless communications system that supports semi-persistently scheduled rate-splitting communications in accordance with one or more aspects of the present disclosure.

FIG. 2 illustrates an example of a wireless communications system 200 that supports semi-persistently scheduled rate-splitting communications in accordance with one or more aspects of the present disclosure. The wireless communications system 200 may implement one or more aspects of the wireless communications system 100. For example, the wireless communications system 200 may include a network entity 105-*a*, a UE 115-*a*, and a UE 115-*b*, which may be examples of a network entity 105 and UEs 115, respectively, as described with reference to FIG. 1. In some cases, the network entity 105-*a* may communicate with the UE 115-*a* and the UE 115-*b* according to a rate-splitting encoding design. That is, the network entity 105-*a* may transmit a data transmission 205 to a UE group 210 (e.g., including the UE 115-*a* and the UE 115-*b*) such that the UE 115-*a* and the UE 115-*b* each receive private portions of respective downlink messages, as well as a same common portion.

In some cases, the network entity 105-*a* may utilize rate-splitting techniques to encode the data transmission 205. Initially, the network entity 105-*a* may identify a first downlink message addressed to the UE 115-*a* (e.g., the message $W_1$) and may identify a second downlink message addressed to the UE 115-*b* (e.g., the message $W_2$). Each downlink message may be input to respective message splitter 215 and may be partitioned into a common portion and a private portion. For example, the message $W_1$ (e.g., addressed to the UE 115-*a*) may be split into a common portion $W_{1,c}$ and a private message $W_{1,p}$ via a message splitter 215-*a* and the message $W_2$ (e.g., addressed to the UE 115-*b*) may be split into a common portion $W_{2,c}$ and a private message $W_{2,p}$ via a message splitter 215-*b*. The common portions of each downlink message (e.g., $W_{1,c}$ and $W_{2,c}$) may then be concatenated into a common message $W_c$ via a combiner 220.

Following the formation of the private message $W_{1,p}$, the private message $W_{2,p}$, and the common message $W_c$, the network entity 105-*a* may separately encode and modulate each message via a respective encoder 225. That is, the private message $W_{1,p}$ may be input to an encoder 225-*a* to create a private stream $X_1$, the private message $W_{2,p}$ may be input to an encoder 225-*b* to create a private stream $X_2$, and the common message may be input to an encoder 225-*b* to create a common stream $X_c$. It should be noted that each encoder 225 may include a modulation and mapping of a respective message to one or more layers, in addition to encoding the respective message. In some cases, the common stream $X_c$ may be associated with one or more layers.

In some examples, each stream (e.g., the private stream $X_1$, the private stream $X_2$, and the common stream $X_c$) may be input to a precoder 230, which may precode each stream by a respective variable. For example, the private stream $X_1$ may be precoded by a variable $P_1$, the private stream $X_2$ may be precoded by a variable $P_2$, and the common stream $X_c$ may be precoded by a variable $P_c$. The network entity 105-*a* may sum the precoded streams to generate a rate-split downlink message (e.g., $X = P_1 X_c + P_1 X_1 + P_2 X_2$). Further, the network entity 105-*a* and may transmit the rate-split downlink message to the UE 115-*a* via a wireless channel $H_1$ and may transmit the rate-split downlink message to the UE 115-*b* via a wireless channel $H_2$. It should be noted that transmission of the rate-split downlink message may be performed via antenna elements of one transmission-reception point (TRP) (e.g., the network entity 105-*a*), or may be performed via antenna elements of multiple TRPs (e.g., multiple network entities 105 in a coordinated multi-point (CoMP) scenario).

In some examples, the UE 115-*a* and the UE 115-*b* may receive the data transmission 205 as a function of the respective wireless channels (e.g., $H_1$ and $H_2$) and the rate-split downlink message (e.g., $X = P_c X_c + P_1 X_1 + P_2 X_2$). For instance, the UE 115-*a* may receive a rate-split downlink signal $Y_1$, which may be characterized by the equation $H_1 P_c X_c + H_1 P_1 X_1 + H_1 P_2 X_2 + N_1$. Additionally, or alternatively, the network entity 105-*a* may indicate, to the UE 115-*a* and the UE 115-*b*, encoding information to support decoding of the rate-split downlink signals (e.g., the signal $Y_1$ addressed to UE 115-*a* and a signal $Y_2$ addressed to UE 115-*b*).

Using the received rate-split downlink signal, the UE 115-*a* may first decode the common message (e.g., $W_c$), as the common message may contain a portion of the individual message meant for the UE 115-*a* (e.g., $W_{1,c}$). Further, decoding of the common message may support successive interference cancelation for decoding of the private message meant for the UE 115-*a* (e.g., $W_{1,p}$). As an example, the UE 115-*a* may estimate the effective channel corresponding to a common stream (e.g., $H_1 P_c$), may decode the common message according to the estimated effective channel, and may re-encode the message to a common stream (e.g., $X_c$). The UE 115-*a* may then multiply the common stream by the estimated effective channel and may subtract a product of the multiplication from the received rate-split downlink signal (e.g., $Y_{1,p} = Y_1 - H_1 P_c X_c = H_1 P_1 X_1 + H_1 P_2 X_2 + N_1$). Accordingly, the UE 115-*a* may decode the private message, $W_{1,p}$, using $Y_{1,p}$ (e.g., due to the UE 115-*a* having knowledge of $H_1$ and $P_1$ to obtain $X_1$). The UE 115-*b* may perform similar processes to obtain the downlink message intended for the UE 115-*b*, $W_2$, using a received rate-split downlink signal, $Y_2$.

In some cases, UEs 115 communicating with the network entity 105-*a* (e.g., the UE 115-*a* and the UE 115-*b* communicating with network entity 105-*a*) may perform communications according to a time-domain duplexing (TDD) slot format configuration. That is, the UEs 115 may transmit and receive signals via slots (e.g., time-domain resource elements) associated with respective communication streams (e.g., uplink communications and downlink communications). Such a TDD slot format may be associated with one or more patterns (e.g., a first pattern, a second pattern, or both), which the UEs 115 may determine according to a configured parameter (e.g., TDD-UL-DL-Configuration-Common). The one or more patterns may indicate a quantity of slots, a quantity of symbols, or both, which correspond to a respective communication direction, and may indicate whether such slots, symbols, or both are configured to be flexible or non-flexible. It should be noted that while the term 'slot' is primarily used throughout the present disclosure, the proposed techniques are applicable to any granularity of time domain resources (e.g., a symbol, a sub slot).

In some cases, a flexible slot may indicate a time-domain resource that is associated with an initial communication direction, but may be updated to be associated with a different communication direction. Accordingly, a non-flexible slot may indicate a time-domain resource that is associated with an initial communication direction that is to remain static during communications.

In some examples, one or more of the UEs 115 may receive an indication of a parameter which may configure one or more existing flexible slots (e.g., TDD-UL-DL-ConfigDedicated). For example, the UE 115-*a* and the UE 115-*b* may communicate according to a same TDD slot pattern (e.g., communicate via flexible slots that are aligned in time), and the network entity 105-*a* may indicate, to the UE 115-*a* and the UE 115-*b*, communication directions for the flexible slots of each respective UE 115. In some cases, the network entity 105-*a* may configure the UE 115-*a* and the UE 115-*b* with a parameter (e.g., SlotFormatCombination) which may indicate that the UEs 115 are to monitor for control information (e.g., monitor DCI format 2_0) including a slot format indicator (SFI). The UE 115-*a*, the UE 115-*b*, or both may overwrite or may change a communication direction of a flexible slot upon identifying an SFI, allowing for the network entity 105-*a* to dynamically control the flexible slots of the UEs 115.

In some examples, the network entity 105-*a* may transmit messages that are common to the UE 115-*a* and the UE 115-*b* relatively frequently, and may rate-split such messages (e.g., to satisfy data requirements). The network entity 105-*a* may transmit a DCI to the UE 115-*a* and the UE 115-*b* to dynamically grant the UEs 115 with resources for receiving rate-split messages. However, as the frequency of rate-split downlink occasions increases, the signaling overhead associated with dynamically granting the downlink occasions may increase.

To support communicating frequent rate-split messages to the UE 115-*a* and the UE 115-*b*, the network entity 105-*a* may establish a semi-persistently scheduled (SPS) design for rate-split downlink occasions (e.g., a joint SPS configuration for both of the UE 115-*a* and the UE 115-*b*). Such a design may reduce signaling overhead at the network entity 105-*a* as less DCIs may be communicated (e.g., multiple rate-split downlink occasions may be configured with one DCI). In some cases, the network entity 105-*a* may configure the SPS rate-split downlink occasions such that rate-splitting occurs via non-flexible slots (e.g., as further described with reference to FIG. 3A). Alternatively, the network entity 105-*a* may configure the SPS rate-split downlink occasions such that rate-splitting occurs via both flexible slots and non-flexible slots (e.g., as further described with reference to FIG. 3B).

FIG. 3A illustrates an example of a slot diagram 301 that supports semi-persistently scheduled rate-splitting communications in accordance with one or more aspects of the present disclosure. The slot diagram 301 may be implemented by one or more aspects of the wireless communications system 200 and the wireless communications system 100. For example, the slot diagram 301 may include a slot format 305-*a* and a slot format 305-*b*, which may be slot formats used by a first UE 115 and a second UE 115, respectively, communicating with a network entity 105 in accordance with a semi-persistent rate-splitting design (e.g., the UE 115-*a* and the UE 115-*b* as described with reference to FIG. 2). In some cases, the slot diagram 301 may be an example of an SPS rate-splitting configuration that is defined for non-flexible slots.

In some examples, a slot format 305 may correspond to a TDD slot format pattern used by a UE 115. For example, the first UE 115 may communicate according to the slot format 305-*a* and the second UE 115 may communicate according to the slot format 305-*b*. The slot format 305-*a* and the slot format 305-*b* may be configured according to one or more slot patterns, which may be characterized by periodic patterns of communication directions and a flexibility status associated with respective slots of the slot formats 305. For example, the slot format 305-*a* and the slot format 305-*b* may follow a common periodic slot flexibility pattern (e.g., a non-flexible slot 315, a flexible slot 320, a flexible slot 320, and a non-flexible slot 315). In some cases, the initial communication direction associated with flexible slots of the slot format 305-*a* and the slot format 305-*b* may be different. That is, the slot format 305-*a* may initially follow a first communication direction pattern (e.g., a TDD dedicated configuration including a downlink slot, a downlink slot, a downlink slot, and an uplink slot) and the slot format 305-*b* may initially follow a second communication direction pattern (e.g., a TDD dedicated configuration including a downlink slot, a downlink slot, an uplink slot, and an uplink slot).

The first UE 115 and the second UE 115 may receive, from a network entity 105, control information which indicates an SPS configuration for one or more downlink occasions for receiving rate-split messages (e.g., received by both the first UE 115 and the second UE 115). In some examples, the SPS configuration may be associated with a periodicity at which rate-splitting SPS occasions 325 are to occur. For example, based on the received control information, the first UE 115 and the second UE 115 may identify that a non-flexible slot (e.g., associated with a same communication direction for the first UE 115 and the second UE 115) is periodically (e.g., every four slots) configured as a rate-splitting SPS occasion 325. Further, the configuration may indicate a time-domain resource allocation, a frequency-domain resource allocation, a periodicity, a modulation and coding scheme (MCS), or any combination thereof. In some examples, the configuration may be for the common messages and private messages of both the first UE 115 and the second UE 115.

In some examples, to support decoding of the rate-split messages at the UEs 115, the control information indicating the SPS configuration may include encoding information for common messages and private messages for both the first UE 115 and the second UE 115. The control information may be communicated via higher-layer signaling (e.g., an RRC configuration). Additionally, the network entity may transmit the control information as a multicast message addressed to both the first UE 115 and the second UE 115 or may transmit the control information as a unicast message to each of the first UE 115 and the second UE 115 (e.g., via UE-specific RRC messages).

In some cases, the first UE 115 and the second UE 115 may begin to communicate in accordance with the SPS rate-splitting configuration upon receipt of the control information (e.g., a type 1 configuration including an RRC activation). In some cases, the network entity 105 may communicate an activation message after transmission of the control information to initiate the SPS rate-splitting communications (e.g., a type 2 configuration). For example, the network entity 105 may transmit a medium access control (MAC) control element (MAC-CE) activation message that is addressed to both the first UE 115 and the second UE 115. As another example, the network entity 105 may transmit a DCI activation message to the first UE 115 and the second UE 115, which may be addressed to both the first UE 115 and the second UE 115 via a common radio network temporary identifier (RNTI).

In some systems, such as the system of the slot diagram 301, the network entity 105 may configure the rate-splitting SPS occasions 325 to occur at non-flexible slots (e.g., excluding flexible slots). Such a configuration may be due to flexible symbols being different across the first UE 115 and the second UE 115 (e.g., configured per-UE by TDD-UL-DL-ConfigDedicated). That is, the network entity 105 may configure the rate-splitting SPS occasions 325 to occur at slots having a common configuration across the first UE 115 and the second UE 115 (e.g., configured for both UEs 115 by TDD-UL-DL-ConfigurationCommon).

FIG. 3B illustrates an example of a slot diagram 302 that supports semi-persistently scheduled rate-splitting communications in accordance with one or more aspects of the present disclosure. The slot diagram 302 may be implemented by one or more aspects of the wireless communications system 200 and the wireless communications system 100. For example, the slot diagram 302 may include a slot format 310-a and a slot format 310-b, which may be slot formats used by a first UE 115 and a second UE 115, respectively, communicating with a network entity 105 in accordance with a semi-persistent rate-splitting design (e.g., the UE 115-a and the UE 115-b as described with reference to FIG. 2). In some cases, the slot diagram 302 may be an example of an SPS rate-splitting configuration that is defined for both non-flexible slots and flexible slots.

In some examples, the slot format 310-a and the slot format 310-b may be examples of the slot format 305-a and the slot format 305-b that are used by the first UE 115 and the second UE 115, respectively, as described with reference to FIG. 3A. The network entity 105 may indicate, via control signaling, that the first UE 115 and the second UE 115 are to receive rate-split downlink messages according to an SPS configuration that includes both non-flexible slots 315 and flexible slots 320. For example, the SPS configuration may indicate a periodicity (e.g., every two slots) for rate-splitting SPS occasions 330. Such a periodicity may coincide with one or more flexible slots 320, which may be dynamically overridden to a downlink communication direction when the first UE 115 and the second UE 115 are configured with different communication directions.

In some cases, the SPS configuration may indicate a default behavior for the first UE 115 and the second UE 115 in the event of an SFI change for a slot associated with a rate-splitting SPS occasion 325. That is, the network entity 105 may transmit a DCI 335 to the first UE 115 and the second UE 115 including an SFI, which may indicate one or more slots that are to change communication direction for the first UE 115, the second UE 115, or both. For examples, the network entity 105 may transmit the DCI 335 including an SFI which changes a slot in the slot format 310-b (e.g., corresponding to the second UE 115) from downlink to uplink. In such examples, the first UE 115 may maintain a same communication direction for a slot in the slot format 310-a corresponding to the modified slot in the slot format 310-b, and may still receive signaling from the network entity 105 as a non-rate-splitting SPS occasion 330.

To support the first UE 115 receiving signaling via a non-rate splitting SPS occasion 330 (e.g., an occasion configured for periodic rate-splitting but dropped due to an SFI change for the second UE 115), the network entity 105 may include non-rate-splitting transmission parameters (e.g., fallback parameters) and corresponding encoding information as part of the control information indicating the rate-splitting SPS configuration. Additionally, or alternatively, network entity 105 may transmit, to the first UE 115, the second UE 115, or both, information related to converting a rate-splitting SPS occasion 325 to a non-rate-splitting SPS occasion 330.

In one example, the network entity 105 may transmit the DCI 335 including an SFI to both of the first UE 115 and the second UE 115 (e.g., addressed to both UEs 115 with a same RNTI). In such an example, the DCI 335 may include a bit indication specifying which UE 115 is associated with the SFI change. For instance, the first UE 115 may identify that the second UE 115 is to modify a communication direction of flexible slot configured for SPS rate-splitting, and may thus receive information via a corresponding slot (e.g., a non-rate-splitting SPS occasion 330 of the slot format 310-a) according to the non-rate splitting transmission parameters. In some cases, the meaning of the bit indication may be included as part of the control information indicating the SPS configuration.

In another example, the network entity 105 may transmit a DCI 335 to the first UE 115 indicating that one or more subsequent rate-splitting SPS occasions 325 (e.g., the next N occasions) are to be decoded as non-rate-splitting SPS occasions 330. For example, the network entity 105 may identify that relatively high-priority data is to be communicated with the second UE 115 at one or more slots configured for a rate-splitting SPS occasions 325, and may indicate the one or more slots to the first UE 115 via the DCI 335. Further, the network entity 105 may transmit a DCI 335 to the second UE 115 indicating a cancellation of the one or more slots configured for a rate-splitting SPS occasions 325. Alternatively, the second UE 115 may be configured to infer (e.g., autonomously) that rate-splitting SPS occasions 325 which overlap with relatively high-priority communications are to be canceled (e.g., without additional signaling).

Figure 4:
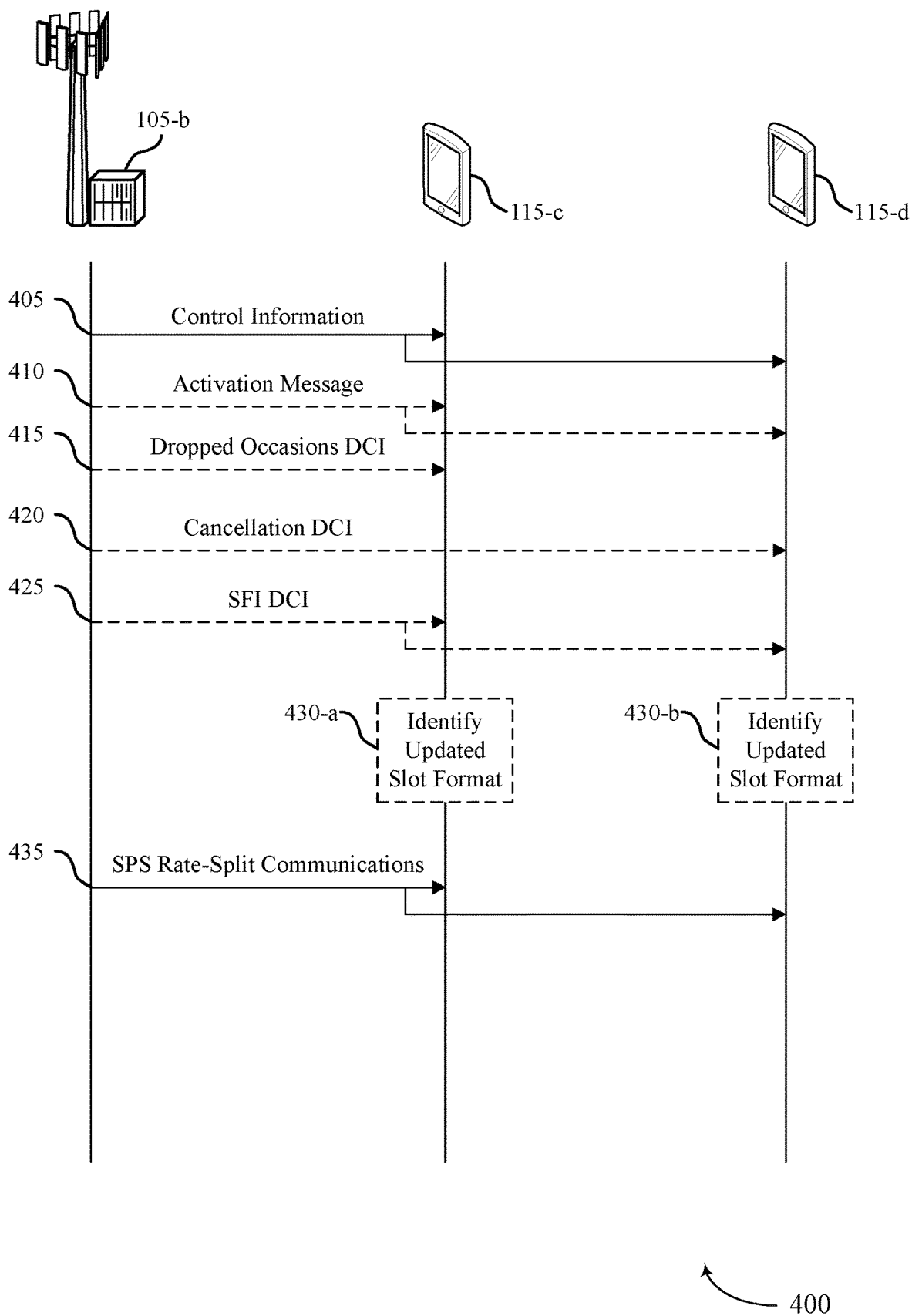
FIG. 4 illustrates an example of a process flow that supports semi-persistently scheduled rate-splitting communications in accordance with one or more aspects of the present disclosure.

FIG. 4 illustrates an example of a process flow 400 that supports semi-persistently scheduled rate-splitting communications in accordance with one or more aspects of the present disclosure. The process flow 400 may implement aspects of the wireless communications system 100 and the wireless communications system 200. For example, the process flow 400 may include a network entity 105-b, a UE 115-c, and a UE 115-d, which may be examples of a network entity 105 and UEs 115, respectively, as described with reference to FIG. 1.

In some cases, the process flow 400 may be an example of processes performed by the network entity 105-b, the UE 115-c, and the UE 115-d communicating in accordance with a rate-splitting SPS configuration, such as the network entity 105-a, the UE 115-a, and the UE 115-b as described with reference to FIG. 2. Alternative examples of the following may be implemented, where some processes are performed in a different order than described or are not performed. In some cases, processes may include additional features not mentioned below, or further processes may be added.

At 405, the network entity 105-b may transmit control information to the UE 115-c and the UE 115-d. The control information may schedule the UE 115-c and the UE 115-d to receive semi-persistent communication over multiple downlink occasions, and may include encoding information for receipt, during at least one of the multiple downlink occasions, of a first downlink message that is encoded into a common portion and a first private portion (e.g., a rate-split downlink message).

Further, the encoding information may be associated with rate-splitting of a set of multiple downlink messages for corresponding ones of the UE 115-c and the UE 115-d. In some cases, the control information may be communicated via an RRC link, and may be transmit as a multicast message to each of the UE 115-c and the UE 115-d, or may be transmit as multiple unicast messages specific to a respective one of the UE 115-c and the UE 115-d. Additionally, or alternatively, the control information may include a time domain resource allocation for one or more downlink messages, a frequency domain resource allocation for the one or more downlink messages, a periodicity of the one or more downlink messages, an MCS for the one or more downlink messages, or any combination thereof, where each downlink message of the one or more downlink messages includes a respective common portion and a respective set of multiple private portions.

In some cases, the control information may indicate an SPS configuration for rate-split communications having a periodicity which overlaps with non-flexible slots of the UEs 115, or a periodicity which overlaps with non-flexible slots and flexible slots of the UEs 115. For instance, each downlink occasion of the set of multiple downlink occasions may correspond to a respective non-flexible slot of a set of multiple non-flexible slots, where the set of multiple non-flexible slots are common to the UE 115-c and the UE 115-d. In some other cases, each downlink occasion of a first subset of the set of multiple downlink occasions may correspond to a respective non-flexible slot of a set of multiple non-flexible slots and each downlink occasion of a second subset of the set of multiple downlink occasions may correspond to a respective flexible slot of a set of multiple flexible slots, where the set of multiple non-flexible slots are common to the UE 115-c and the UE 115-d.

At 410, the network entity 105-b may optionally transmit an activation message to the UE 115-c and the UE 115-d. In some cases, the activation message may be transmitted after transmission of the control information and may activate the rate-splitting SPS communications. That is, the rate-splitting SPS communications may be configured via a first indication (e.g., an RRC message) and may be activated via a subsequent message. The activation message may be transmitted as a MAC-CE that is addressed to both of the UE 115-c and the UE 115-d, or may be transmitted as a DCI message that is addressed to the UE 115-c and the UE 115-d according to a common RNTI.

At 415, the network entity 105-b may optionally transmit one or more dropped occasions DCI to the UE 115-c. For instance, the network entity 105-b may identify that the UE 115-d is to communicate high-priority data (or any other suitably significant communications) at one or more downlink occasions scheduled for rate-splitting. In such cases, the network entity 105-b may indicate, to the UE 115-c, that the one or more downlink occasions are to be dropped as rate-splitting occasions, and instead the UE 115-c is to decode communications according to fallback transmission parameters. In some cases, the fallback transmission parameters may be included in the control information indicating the rate-splitting SPS configuration.

At 420, the network entity 105-b may optionally transmit a cancellation indication (e.g., cancellation DCI) to the UE 115-d. Such a DCI may be communicated when the UE 115-d is to cancel one or more rate-splitting SPS downlink occasions due to having scheduled communications with high-priority which overlap with the one or more downlink occasions. Alternatively, the UE 115-d may be configured to infer (e.g., autonomously) that high-priority communications override rate-splitting SPS downlink occasions (e.g., without receiving the cancellation DCI).

At 425, the network entity 105-b may optionally transmit an SFI DCI to the UE 115-c and the UE 115-d. The SFI DCI may indicate that a communication direction of one or more slots is to be modified by the UE 115-c, the UE 115-d, or both. The SFI DCI may be addressed to both of the UE 115-c and the UE 115-d according to a same RNTI.

At 430-a and 430-b, the UE 115-c and the UE 115-d may respectively identify an updated slot format based on receiving the SFI DCI. In some cases, the UE 115-c and the UE 115-d may identify which of the UEs 115 is to make such an update based on a bit indication included in the SFI DCI. Additionally, the meaning of the bit indication may be included in the control information indicating the SPS configuration.

At 435, the network entity 105-b may transmit SPS rate-split communications to the UE 115-c and the UE 115-d in accordance with the rate-splitting SPS configuration, as well as any modified downlink occasions (e.g., to accommodate high-priority communications). For example, the network entity 105-b may transmit rate-split communications at a configured periodicity to the UE 115-c and the UE 115-d, and may communicate non-rate-split communications via downlink occasions which have been dropped. The rate-split communications may include multiple private portions respective to each of the UE 115-c and the UE 115-d and a common portion that is common to each of the UE 115-c and the UE 115-d.

Figure 5:
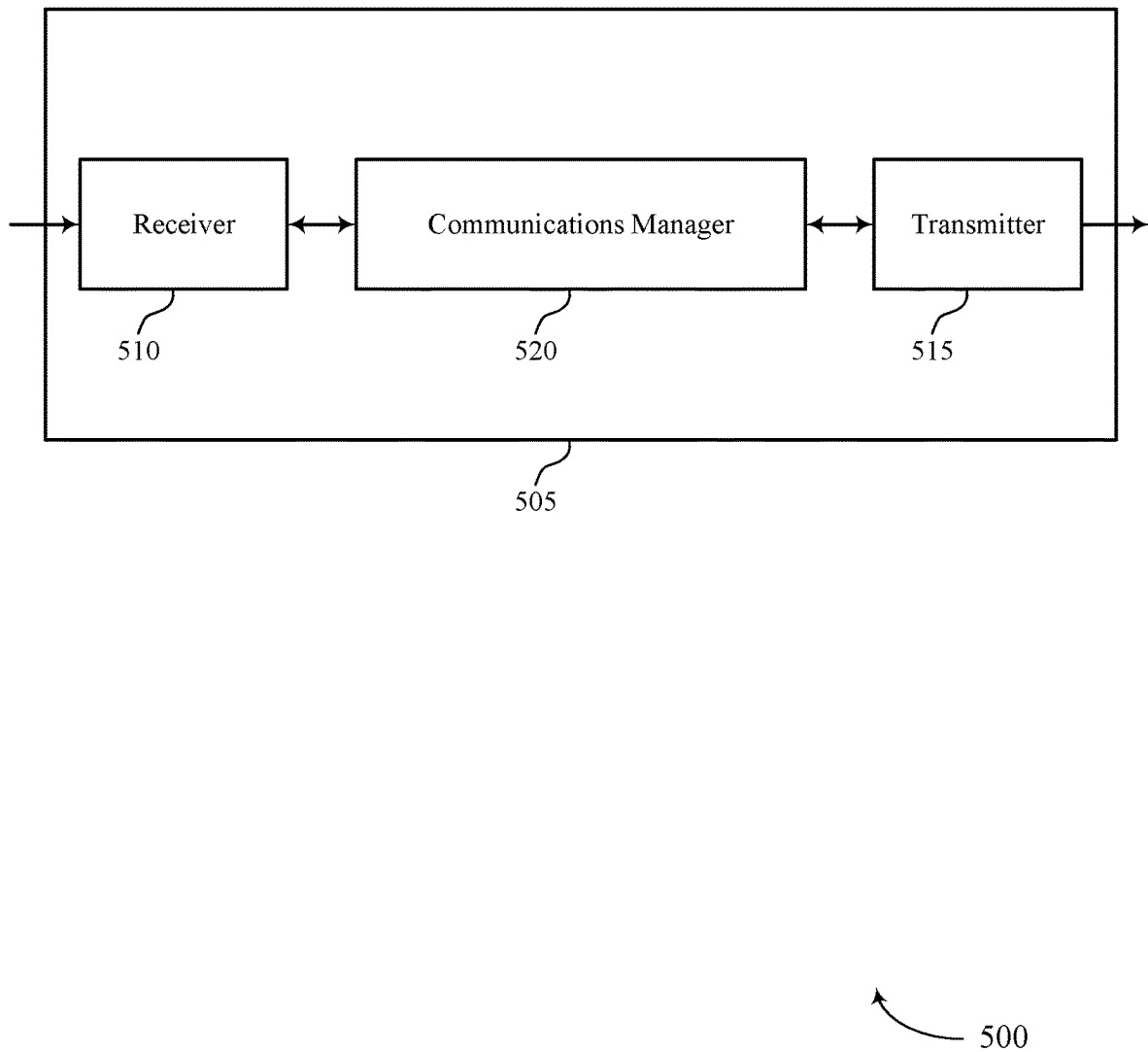
FIGS. 5 and 6 illustrate block diagrams of devices that support semi-persistently scheduled rate-splitting communications in accordance with one or more aspects of the present disclosure.

FIG. 5 illustrates a block diagram 500 of a device 505 that supports semi-persistently scheduled rate-splitting communications in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to semi-persistently scheduled rate-splitting communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to semi-persistently scheduled rate-splitting communications). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of semi-persistently scheduled rate-splitting communications as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a first UE in accordance with examples as disclosed herein. For example, the communications manager 520 may be configured as or otherwise support a means for receiving control information that schedules the first UE to receive semi-persistent communications over a set of multiple downlink occasions, the control information including encoding information for receipt, during at least one of the set of multiple downlink occasions, of a first downlink message that is encoded into a common portion and a first private portion, where the common portion is common with other downlink messages directed to other UEs and the first private portion is specific to the first UE. The communications manager 520 may be configured as or otherwise support a means for receiving, via at least one of the set of multiple downlink occasions and in accordance with the control information, the common portion and a set of multiple private portions, where the set of multiple private portions includes the first private portion and one or more other private portions corresponding to the other UEs.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for enhanced channel throughput and reduced signaling overhead using an SPS configuration for rate-split communications.

Figure 6:
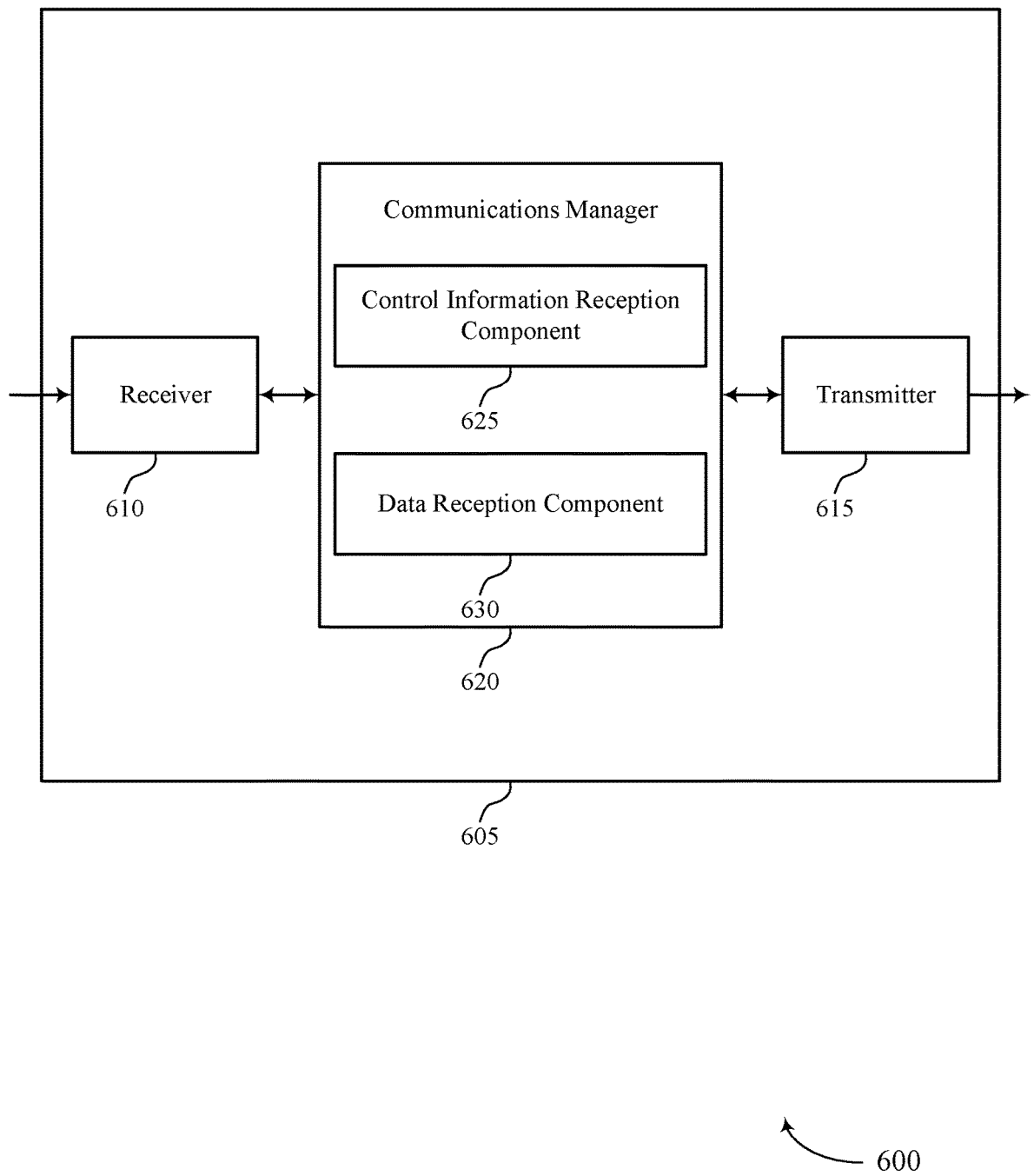

FIG. 6 illustrates a block diagram 600 of a device 605 that supports semi-persistently scheduled rate-splitting communications in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to semi-persistently scheduled rate-splitting communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to semi-persistently scheduled rate-splitting communications). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of semi-persistently scheduled rate-splitting communications as described herein. For example, the communications manager 620 may include a control information reception component 625 a data reception component 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a first UE in accordance with examples as disclosed herein. The control information reception component 625 may be configured as or otherwise support a means for receiving control information that schedules the first UE to receive semi-persistent communications over a set of multiple downlink occasions, the control information including encoding information for receipt, during at least one of the set of multiple downlink occasions, of a first downlink message that is encoded into a common portion and a first private portion, where the common portion is common with other downlink messages directed to other UEs and the first private portion is specific to the first UE. The data reception component 630 may be configured as or otherwise support a means for receiving, via at least one of the set of multiple downlink occasions and in accordance with the control information, the common portion and a set of multiple private portions, where the set of multiple private portions includes the first private portion and one or more other private portions corresponding to the other UEs.

Figure 7:
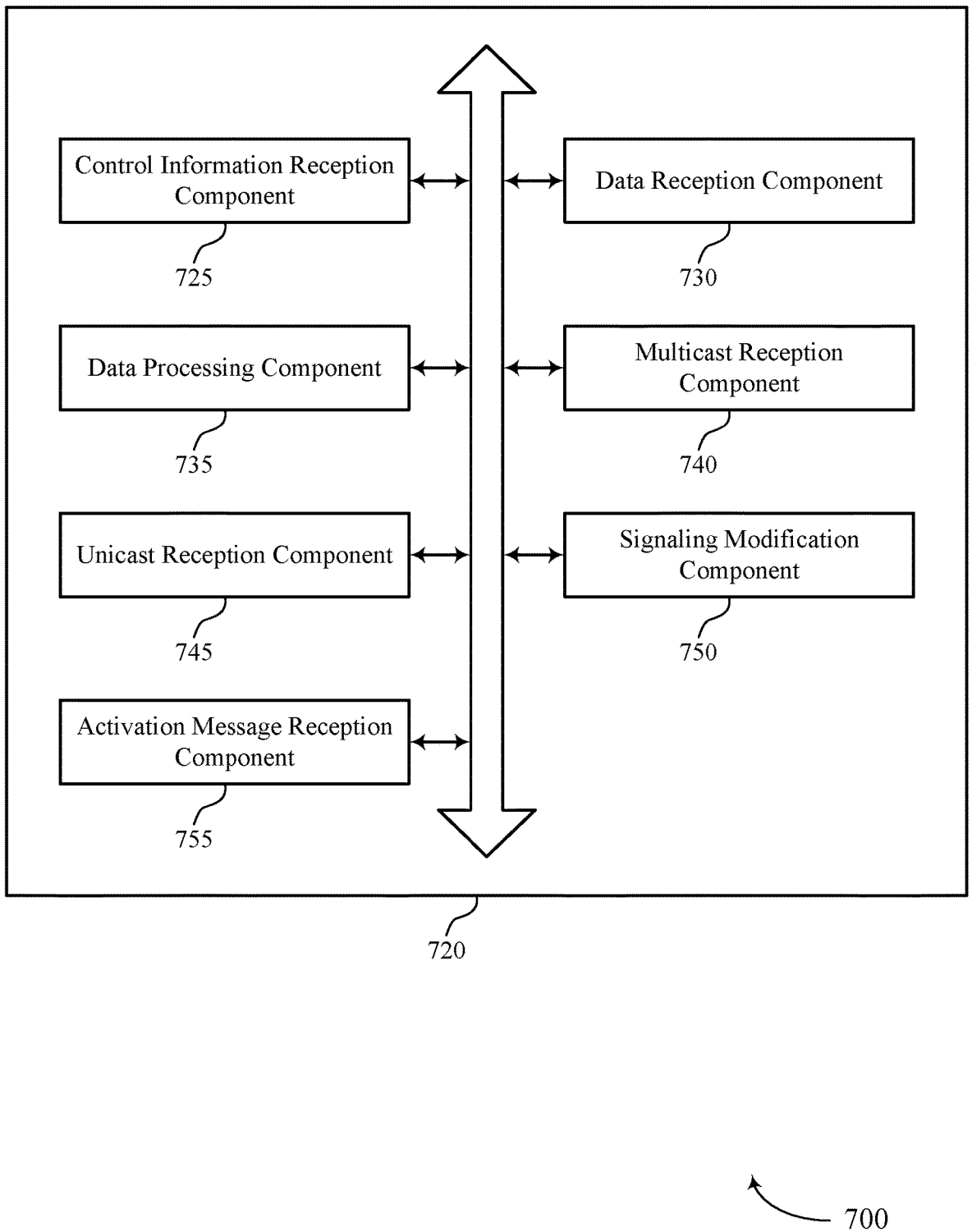
FIG. 7 illustrates a block diagram of a communications manager that supports semi-persistently scheduled rate-splitting communications in accordance with one or more aspects of the present disclosure.

FIG. 7 illustrates a block diagram 700 of a communications manager 720 that supports semi-persistently scheduled rate-splitting communications in accordance with one or more aspects of the present disclosure. The communications manager 720 may be an example of aspects of a communications manager 520, a communications manager 620, or both, as described herein. The communications manager 720, or various components thereof, may be an example of means for performing various aspects of semi-persistently scheduled rate-splitting communications as described herein. For example, the communications manager 720 may include a control information reception component 725, a data reception component 730, a data processing component 735, a multicast reception component 740, a unicast reception component 745, a signaling modification component 750, an activation message reception component 755, or any combination thereof. Each of these components may communicate, directly or indirectly, with one another (e.g., via one or more buses).

The communications manager 720 may support wireless communication at a first UE in accordance with examples as disclosed herein. The control information reception component 725 may be configured as or otherwise support a means for receiving control information that schedules the first UE to receive semi-persistent communications over a set of multiple downlink occasions, the control information including encoding information for receipt, during at least one of the set of multiple downlink occasions, of a first downlink message that is encoded into a common portion and a first private portion, where the common portion is common with other downlink messages directed to other UEs and the first private portion is specific to the first UE. The data reception component 730 may be configured as or otherwise support a means for receiving, via at least one of the set of multiple downlink occasions and in accordance with the control information, the common portion and a set of multiple private portions, where the set of multiple private portions includes the first private portion and one or more other private portions corresponding to the other UEs.

In some examples, the control information includes fallback transmission parameters, and the control information reception component 725 may be configured as or otherwise support a means for receiving a DCI message indicating that one or more downlink occasions of the set of multiple downlink occasions are to be dropped by the first UE, where the DCI message is received based on a first priority level of communications with at least a second UE of the other UEs being higher than a second priority level of the semi-persistent communications. In some examples, the control information includes fallback transmission parameters, and the data reception component 730 may be configured as or otherwise support a means for receiving, via the one or more downlink occasions, one or more subsequent downlink messages. In some examples, the control information includes fallback transmission parameters, and the data processing component 735 may be configured as or otherwise support a means for decoding the one or more subsequent downlink messages in accordance with the fallback transmission parameters.

In some examples, to support control information, the control information reception component 725 may be configured as or otherwise support a means for receiving control information including a time domain resource allocation for one or more downlink messages, a frequency domain resource allocation for the one or more downlink messages, a periodicity of the one or more downlink messages, a MCS for the one or more downlink messages, or any combination thereof, where each downlink message of the one or more downlink messages includes a respective common portion and a respective set of multiple private portions.

In some examples, each downlink occasion of a first subset of the set of multiple downlink occasions corresponds to a respective non-flexible slot of a set of multiple non-flexible slots and each downlink occasion of a second subset of the set of multiple downlink occasions corresponds to a respective flexible slot of a set of multiple flexible slots. In some examples, the set of multiple non-flexible slots are common to the first UE and the other UEs.

In some examples, the control information reception component 725 may be configured as or otherwise support a means for receiving a DCI message including a SFI. In some examples, the signaling modification component 750 may be configured as or otherwise support a means for identifying, based on one or more bits included in the DCI message, that the first UE, a second UE of the other UEs, or both, is to modify a communication direction of one or more flexible slots. In some examples, the data reception component 730 may be configured as or otherwise support a means for receiving one or more downlink messages via the one or more flexible slots, where the one or more downlink messages are received in accordance with one or more non-rate-splitting parameters.

In some examples, the control information reception component 725 may be configured as or otherwise support a means for receiving a DCI message that indicates that, for one or more subsequent downlink occasions, the first UE is to decode one or more corresponding downlink messages in accordance with non-rate-splitting parameters.

In some examples, the encoding information is associated with rate-splitting of a set of multiple downlink messages for corresponding ones of the first UE and the other UEs. In some examples, the set of multiple downlink messages include the first downlink message.

In some examples, each downlink occasion of the set of multiple downlink occasions corresponds to a respective non-flexible slot of a set of multiple non-flexible slots. In some examples, the set of multiple non-flexible slots are common to the first UE and the other UEs.

In some examples, to support receiving the control information, the multicast reception component 740 may be configured as or otherwise support a means for receiving the control information via a multicast message for the first UE and at least a second UE of the other UEs. In some examples, to support receiving the control information, the unicast reception component 745 may be configured as or otherwise support a means for receiving the control information via a unicast message specific to the first UE.

In some examples, to support receiving the common portion and the set of multiple private portions, the activation message reception component 755 may be configured as or otherwise support a means for receiving an activation message after reception of the control information, the activation message activating the semi-persistent communications.

In some examples, to support activation message, the activation message reception component 755 may be configured as or otherwise support a means for receiving an activation message including a MAC-CE, where the MAC-CE is addressed to the first UE and at least the second UE. In some examples, to support activation message, the activation message reception component 755 may be configured as or otherwise support a means for receiving an activation message including a DCI message that is addressed to the first UE and at least the second UE in accordance with a common RNTI.

Figure 8:
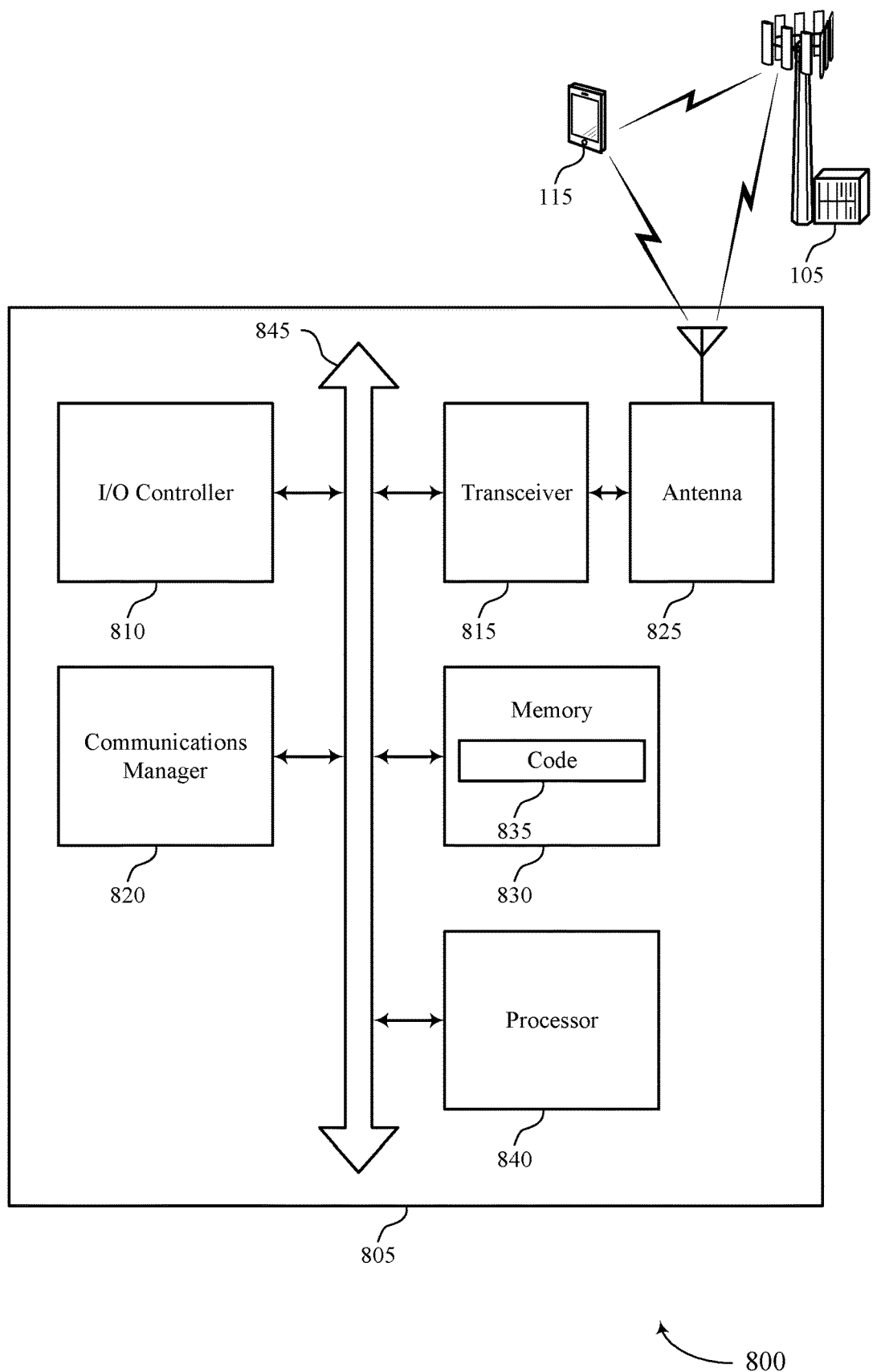
FIG. 8 illustrates a diagram of a system including a device that supports semi-persistently scheduled rate-splitting communications in accordance with one or more aspects of the present disclosure.

FIG. 8 illustrates a diagram of a system 800 including a device 805 that supports semi-persistently scheduled rate-splitting communications in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting semi-persistently scheduled rate-splitting communications). For example, the device 805 or a component of the device 805 may include a processor 840 and memory 830 coupled with or to the processor 840, the processor 840 and memory 830 configured to perform various functions described herein.

The communications manager 820 may support wireless communication at a first UE in accordance with examples as disclosed herein. For example, the communications manager 820 may be configured as or otherwise support a means for receiving control information that schedules the first UE to receive semi-persistent communications over a set of multiple downlink occasions, the control information including encoding information for receipt, during at least one of the set of multiple downlink occasions, of a first downlink message that is encoded into a common portion and a first private portion, where the common portion is common with other downlink messages directed to other UEs and the first private portion is specific to the first UE. The communications manager 820 may be configured as or otherwise support a means for receiving, via at least one of the set of multiple downlink occasions and in accordance with the control information, the common portion and a set of multiple private portions, where the set of multiple private portions includes the first private portion and one or more other private portions corresponding to the other UEs.

By including or configuring the communications manager 820 in accordance with examples as described herein, the device 805 may support techniques for enhanced channel throughput and reduced signaling overhead using an SPS configuration for rate-split communications.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of semi-persistently scheduled rate-splitting communications as described herein, or the processor 840 and the memory 830 may be otherwise configured to perform or support such operations.

Figure 9:
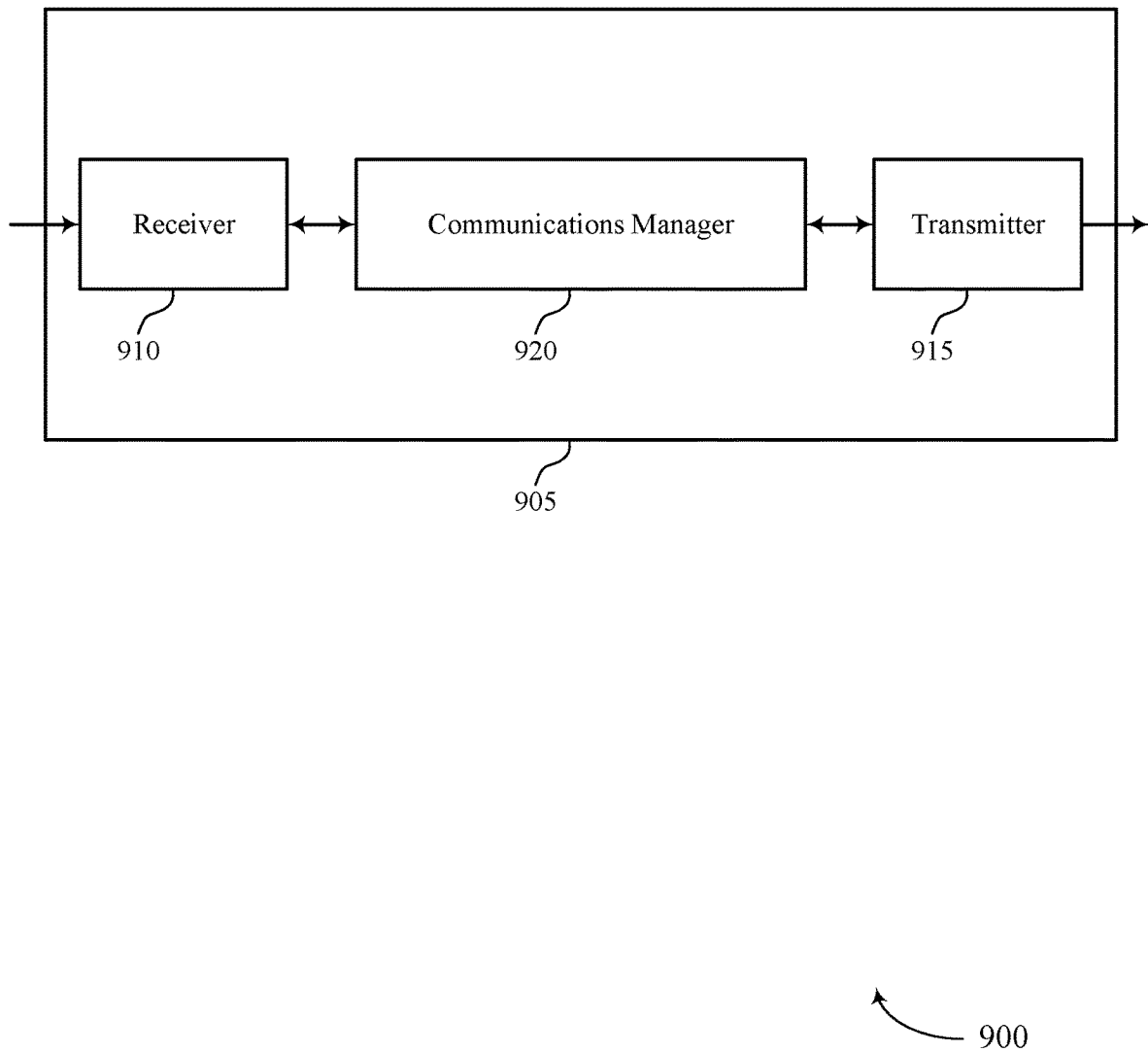
FIGS. 9 and 10 illustrate block diagrams of devices that support semi-persistently scheduled rate-splitting communications in accordance with one or more aspects of the present disclosure.

FIG. 9 illustrates a block diagram 900 of a device 905 that supports semi-persistently scheduled rate-splitting communications in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of semi-persistently scheduled rate-splitting communications as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

For example, the communications manager 920 may be configured as or otherwise support a means for transmitting control information that schedules a set of multiple user equipments (UEs) to receive semi-persistent communications over a set of multiple downlink occasions, the control information including encoding information for receipt, by a first UE of the set of multiple UEs and during at least one of the set of multiple downlink occasions, of a first downlink message that is encoded into a common portion and a first private portion, where the common portion is common with downlink messages directed to other UEs of the set of multiple UEs and the first private portion is specific to the first UE. The communications manager 920 may be configured as or otherwise support a means for transmitting, via at least one of the set of multiple downlink occasions and in accordance with the control information, the common portion and a set of multiple private portions, where the set of multiple private portions includes the first private portion and one or more other private portions corresponding to the other UEs.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for enhanced channel throughput and reduced signaling overhead using an SPS configuration for rate-split communications.

Figure 10:
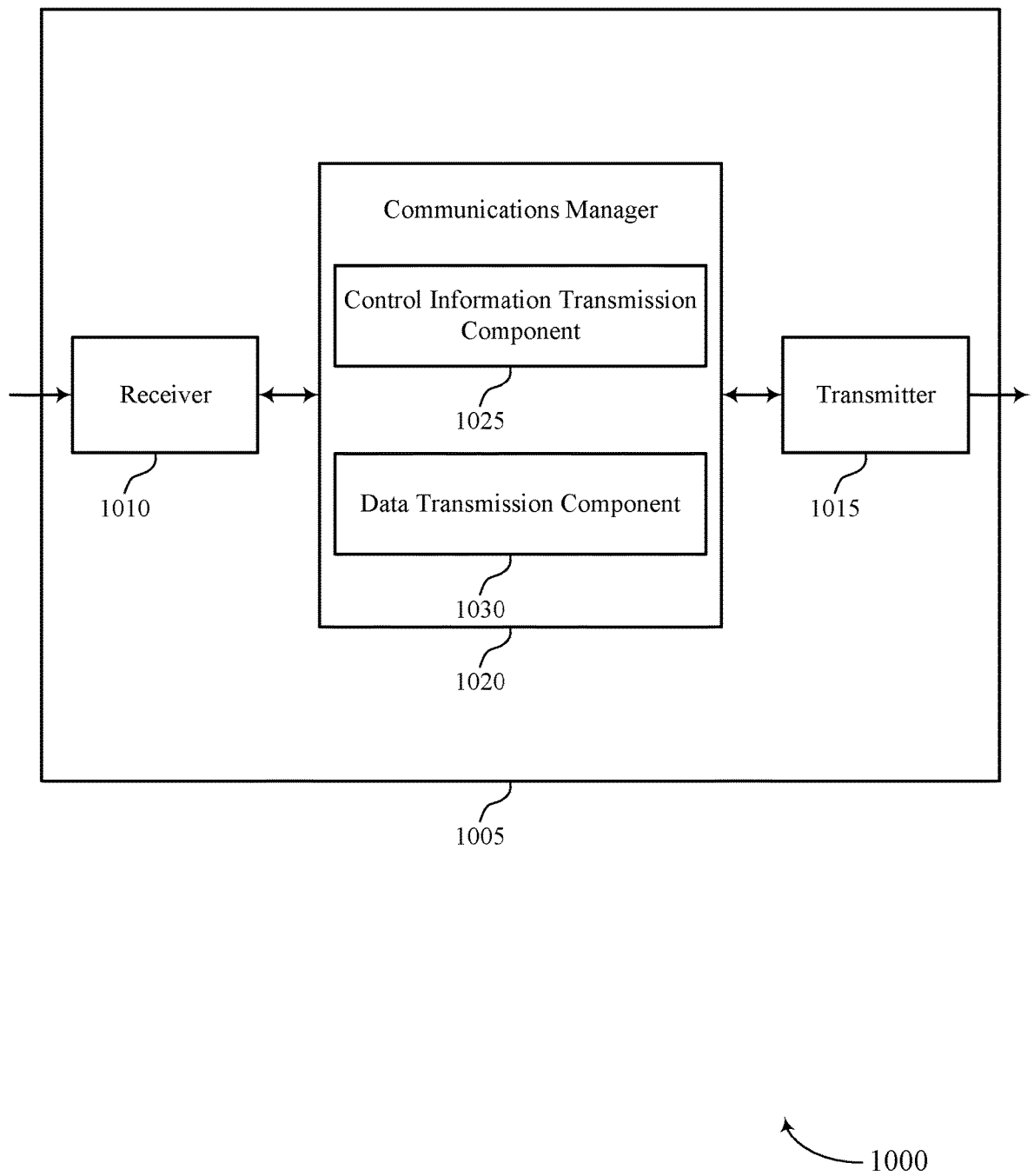

FIG. 10 illustrates a block diagram 1000 of a device 1005 that supports semi-persistently scheduled rate-splitting communications in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of semi-persistently scheduled rate-splitting communications as described herein. For example, the communications manager 1020 may include a control information transmission component 1025 a data transmission component 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The control information transmission component 1025 may be configured as or otherwise support a means for transmitting control information that schedules a set of multiple user equipments (UEs) to receive semi-persistent communications over a set of multiple downlink occasions, the control information including encoding information for receipt, by a first UE of the set of multiple UEs and during at least one of the set of multiple downlink occasions, of a first downlink message that is encoded into a common portion and a first private portion, where the common portion is common with downlink messages directed to other UEs of the set of multiple UEs and the first private portion is specific to the first UE. The data transmission component 1030 may be configured as or otherwise support a means for transmitting, via at least one of the set of multiple downlink occasions and in accordance with the control information, the common portion and a set of multiple private portions, where the set of multiple private portions includes the first private portion and one or more other private portions corresponding to the other UEs.

Figure 11:
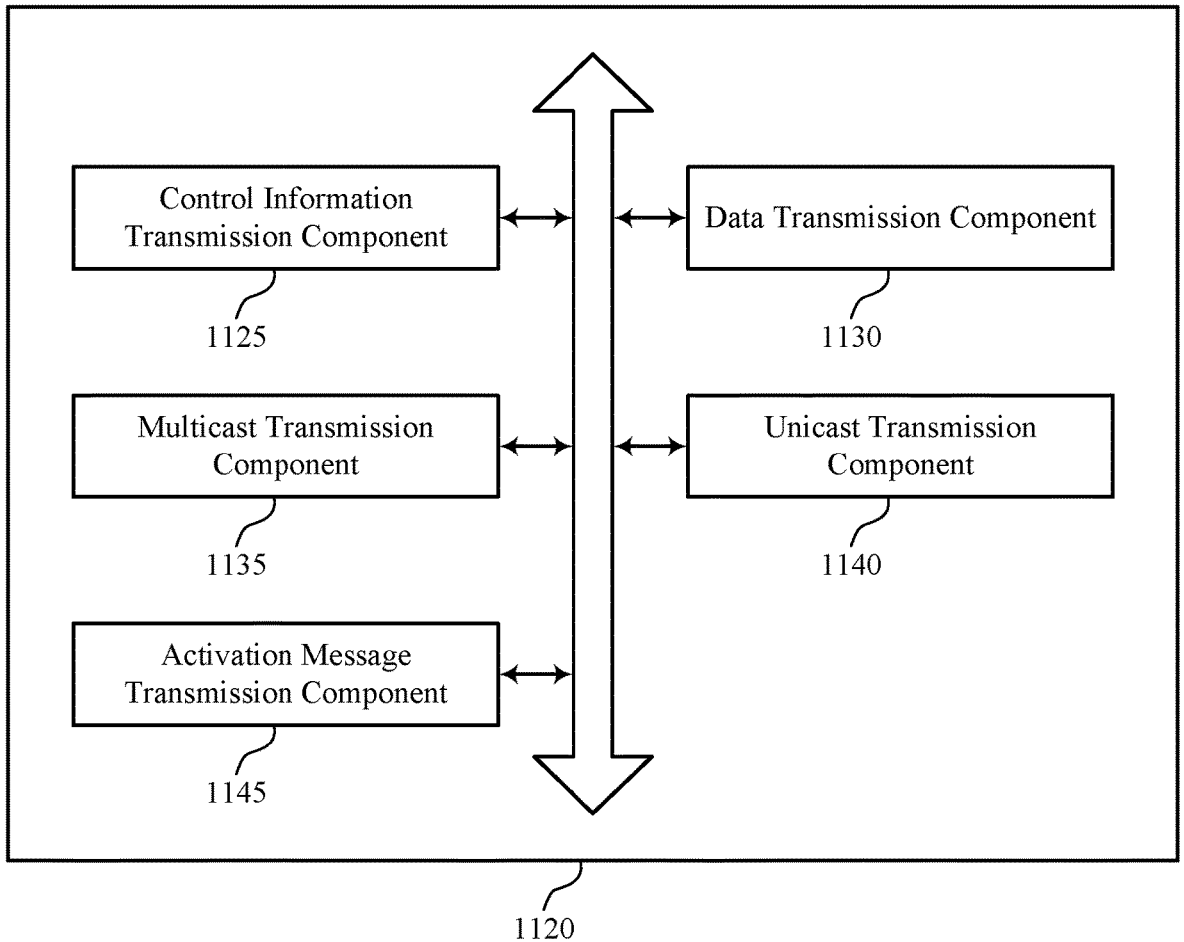
FIG. 11 illustrates a block diagram of a communications manager that supports semi-persistently scheduled rate-splitting communications in accordance with one or more aspects of the present disclosure.

FIG. 11 illustrates a block diagram 1100 of a communications manager 1120 that supports semi-persistently scheduled rate-splitting communications in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of semi-persistently scheduled rate-splitting communications as described herein. For example, the communications manager 1120 may include a control information transmission component 1125, a data transmission component 1130, a multicast transmission component 1135, a unicast transmission component 1140, an activation message transmission component 1145, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The control information transmission component 1125 may be configured as or otherwise support a means for transmitting control information that schedules a set of multiple user equipments (UEs) to receive semi-persistent communications over a set of multiple downlink occasions, the control information including encoding information for receipt, by a first UE of the set of multiple UEs and during at least one of the set of multiple downlink occasions, of a first downlink message that is encoded into a common portion and a first private portion, where the common portion is common with downlink messages directed to other UEs of the set of multiple UEs and the first private portion is specific to the first UE. The data transmission component 1130 may be configured as or otherwise support a means for transmitting, via at least one of the set of multiple downlink occasions and in accordance with the control information, the common portion and a set of multiple private portions, where the set of multiple private portions includes the first private portion and one or more other private portions corresponding to the other UEs.

In some examples, the control information includes fallback transmission parameters, and the control information transmission component 1125 may be configured as or otherwise support a means for transmitting, to the first UE, a DCI message indicating that one or more downlink occasions of the set of multiple downlink occasions are to be dropped by the first UE, where the DCI message is received based on a first priority level of communications with at least a second UE of the other UEs being higher than a second priority level of the semi-persistent communications. In some examples, the control information includes fallback transmission parameters, and the data transmission component 1130 may be configured as or otherwise support a means for transmitting, via the one or more downlink occasions, one or more subsequent downlink messages.

In some examples, to support control information, the control information transmission component 1125 may be configured as or otherwise support a means for transmitting control information including a time domain resource allocation for one or more downlink messages, a frequency domain resource allocation for the one or more downlink messages, a periodicity of the one or more downlink messages, a MCS for the one or more downlink messages, or any combination thereof, where each downlink message of the one or more downlink messages includes a respective common portion and a respective set of multiple private portions.

In some examples, each downlink occasion of a first subset of the set of multiple downlink occasions corresponds to a respective non-flexible slot of a set of multiple non-flexible slots and each downlink occasion of a second subset of the set of multiple downlink occasions corresponds to a respective flexible slot of a set of multiple flexible slots. In some examples, the set of multiple non-flexible slots are common to the first UE and the other UEs.

In some examples, the control information transmission component 1125 may be configured as or otherwise support a means for transmitting a DCI message including a SFI and further including one or more bits indicating that the first UE, a second UE of the other UEs, or both, is to modify a communication direction of one or more flexible slots. In some examples, the data transmission component 1130 may be configured as or otherwise support a means for transmitting one or more downlink messages via the one or more flexible slots, where the downlink messages are transmitted in accordance with one or more non-rate-splitting parameters.

In some examples, the control information transmission component 1125 may be configured as or otherwise support a means for transmitting a DCI message that indicates that, for one or more subsequent downlink occasions, the first UE is to decode one or more corresponding downlink messages in accordance with non-rate-splitting parameters.

In some examples, the encoding information is associated with rate-splitting of a set of multiple downlink messages for corresponding ones of the first UE and the other UEs. In some examples, the set of multiple downlink messages include the first downlink message.

In some examples, each downlink occasion of the set of multiple downlink occasions corresponds to a respective non-flexible slot of a set of multiple non-flexible slots. In some examples, the set of multiple non-flexible slots are common to the first UE and the other UEs.

In some examples, to support transmitting the control information, the multicast transmission component 1135 may be configured as or otherwise support a means for transmitting the control information via a multicast message for the first UE and at least a second UE of the other UEs. In some examples, to support transmitting the control information, the unicast transmission component 1140 may be configured as or otherwise support a means for transmitting the control information via a unicast message specific to the first UE, one or more unicast messages specific to a respective UE of the other UEs, or both.

In some examples, to support transmitting the common portion and the set of multiple private portions, the activation message transmission component 1145 may be configured as or otherwise support a means for transmitting an activation message after reception of the control information, the activation message activating the semi-persistent communications.

In some examples, to support activation message, the activation message transmission component 1145 may be configured as or otherwise support a means for transmitting an activation message including a MAC-CE, where the MAC-CE is addressed to the first UE and at least the second UE. In some examples, to support activation message, the activation message transmission component 1145 may be configured as or otherwise support a means for transmitting an activation message including a DCI message that is addressed to the first UE and at least the second UE in accordance with a common RNTI.

Figure 12:
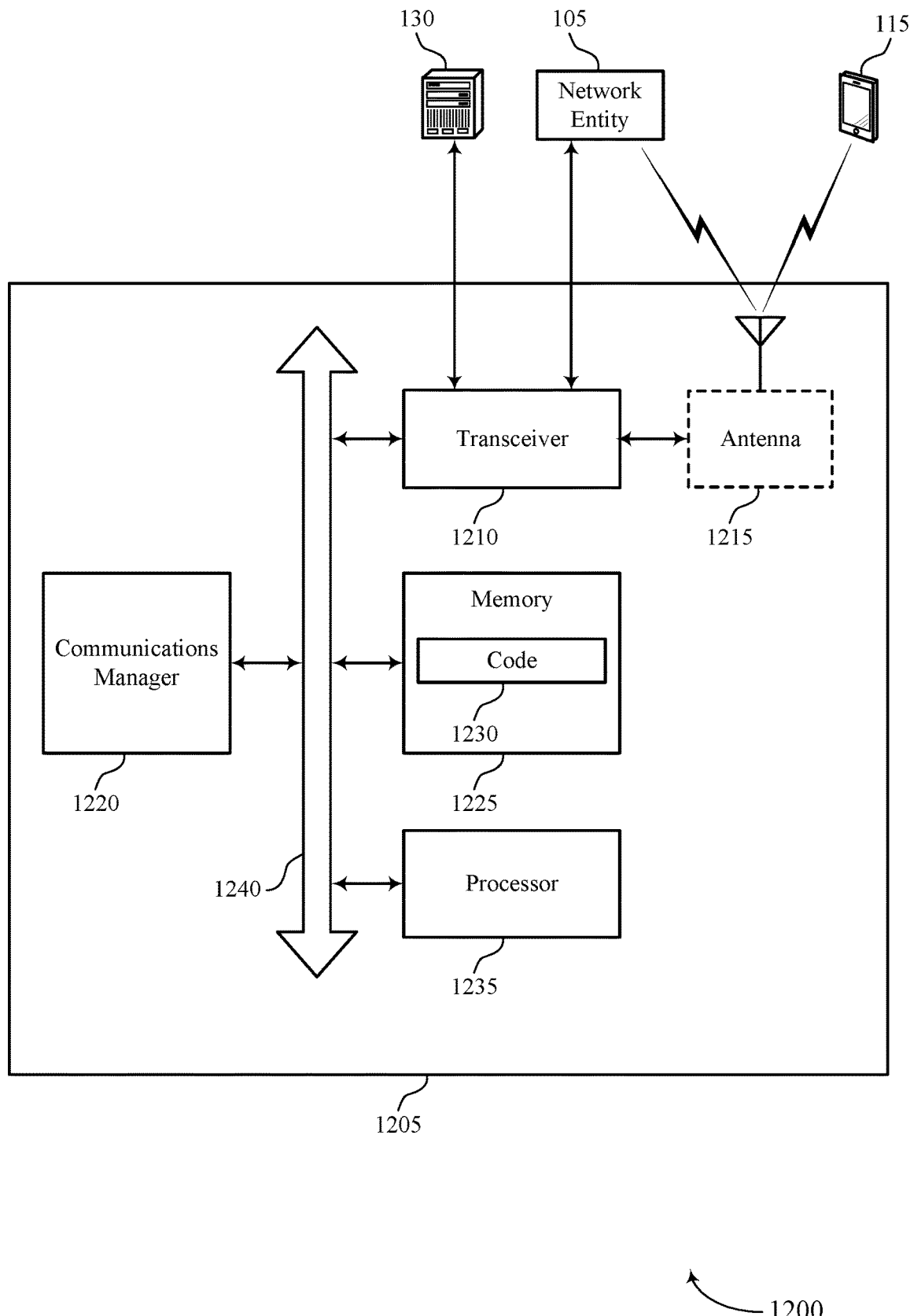
FIG. 12 illustrates a diagram of a system including a device that supports semi-persistently scheduled rate-splitting communications in accordance with one or more aspects of the present disclosure.

FIG. 12 illustrates a diagram of a system 1200 including a device 1205 that supports semi-persistently scheduled rate-splitting communications in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting semi-persistently scheduled rate-splitting communications). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

For example, the communications manager 1220 may be configured as or otherwise support a means for transmitting control information that schedules a set of multiple user equipments (UEs) to receive semi-persistent communications over a set of multiple downlink occasions, the control information including encoding information for receipt, by a first UE of the set of multiple UEs and during at least one of the set of multiple downlink occasions, of a first downlink message that is encoded into a common portion and a first private portion, where the common portion is common with downlink messages directed to other UEs of the set of multiple UEs and the first private portion is specific to the first UE. The communications manager 1220 may be configured as or otherwise support a means for transmitting, via at least one of the set of multiple downlink occasions and in accordance with the control information, the common portion and a set of multiple private portions, where the set of multiple private portions includes the first private portion and one or more other private portions corresponding to the other UEs.

By including or configuring the communications manager 1220 in accordance with examples as described herein, the device 1205 may support techniques for enhanced channel throughput and reduced signaling overhead using an SPS configuration for rate-split communications.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of semi-persistently scheduled rate-splitting communications as described herein, or the processor 1235 and the memory 1225 may be otherwise configured to perform or support such operations.

Figure 13:
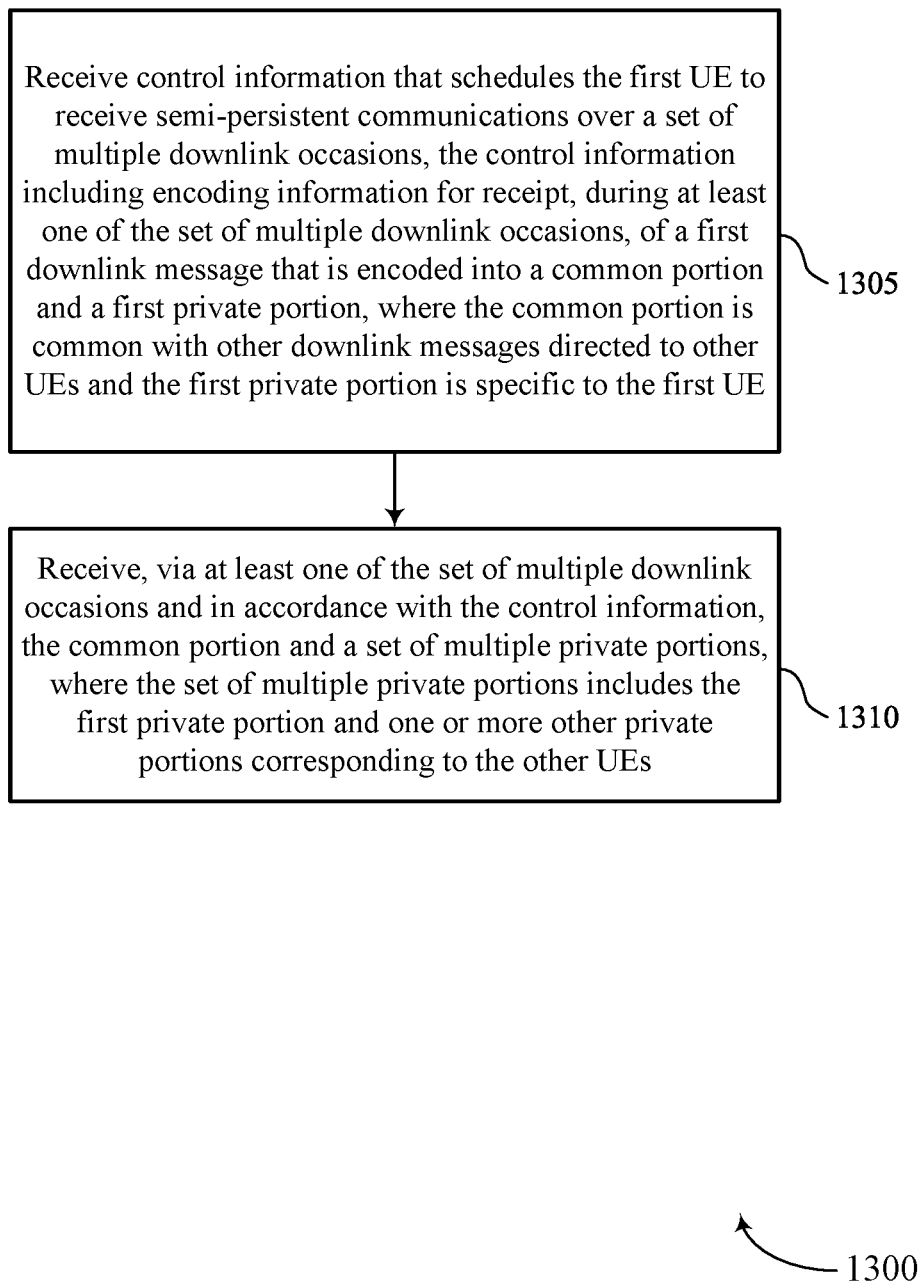
FIGS. 13 through 15 illustrate flowcharts showing methods that support semi-persistently scheduled rate-splitting communications in accordance with one or more aspects of the present disclosure.

FIG. 13 illustrates a flowchart illustrating a method 1300 that supports semi-persistently scheduled rate-splitting communications in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving control information that schedules the first UE to receive semi-persistent communications over a set of multiple downlink occasions, the control information including encoding information for receipt, during at least one of the set of multiple downlink occasions, of a first downlink message that is encoded into a common portion and a first private portion, where the common portion is common with other downlink messages directed to other UEs and the first private portion is specific to the first UE. The operations of 1305 may be performed in accordance with examples as disclosed herein. In some examples, aspects of the operations of 1305 may be performed by a control information reception component 725 as described with reference to FIG. 7.

At 1310, the method may include receiving, via at least one of the set of multiple downlink occasions and in accordance with the control information, the common portion and a set of multiple private portions, where the set of multiple private portions includes the first private portion and one or more other private portions corresponding to the other UEs. The operations of 1310 may be performed in accordance with examples as disclosed herein. In some examples, aspects of the operations of 1310 may be performed by a data reception component 730 as described with reference to FIG. 7.

Figure 14:
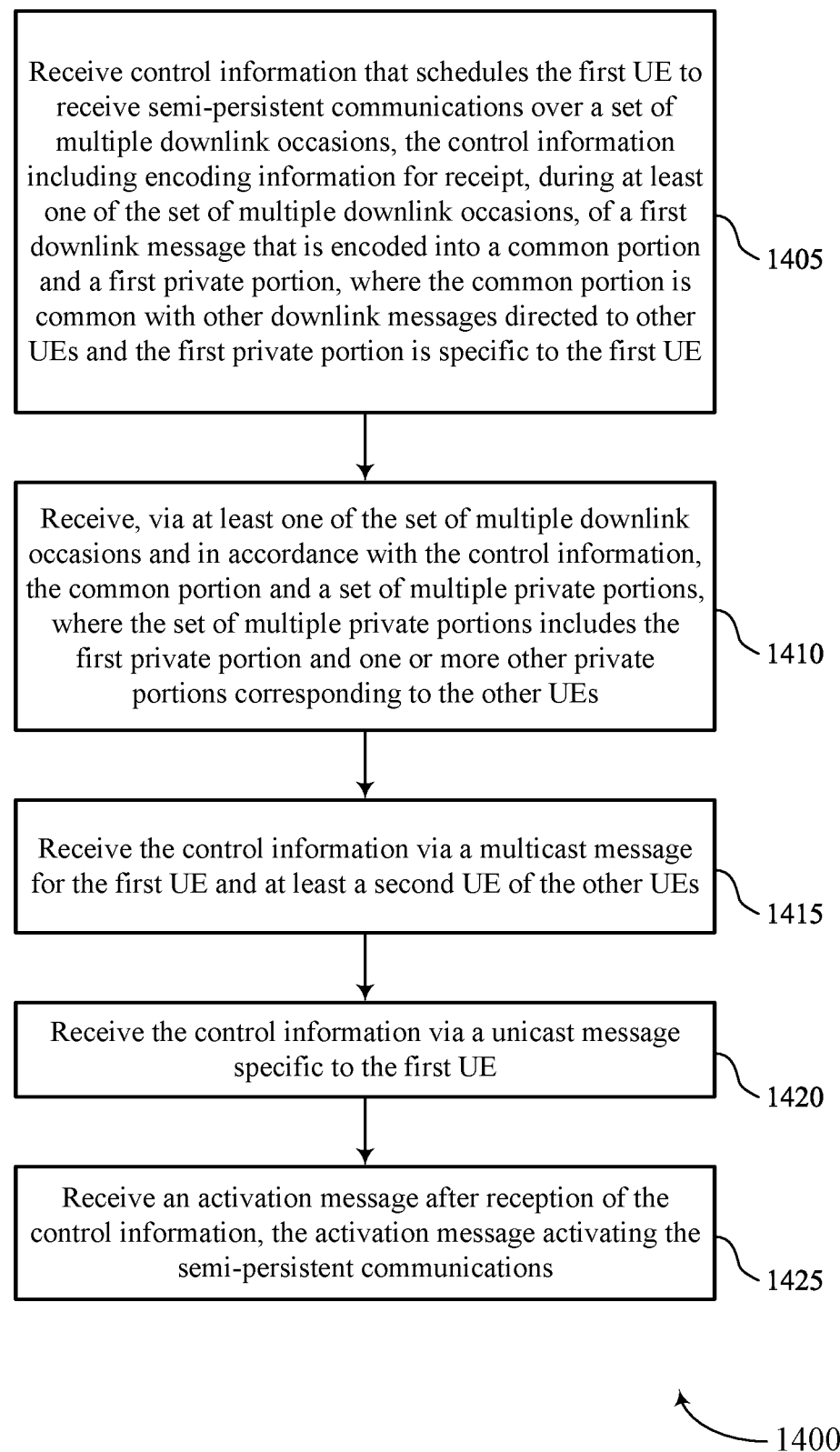

FIG. 14 illustrates a flowchart illustrating a method 1400 that supports semi-persistently scheduled rate-splitting communications in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving control information that schedules the first UE to receive semi-persistent communications over a set of multiple downlink occasions, the control information including encoding information for receipt, during at least one of the set of multiple downlink occasions, of a first downlink message that is encoded into a common portion and a first private portion, where the common portion is common with other downlink messages directed to other UEs and the first private portion is specific to the first UE. The operations of 1405 may be performed in accordance with examples as disclosed herein. In some examples, aspects of the operations of 1405 may be performed by a control information reception component 725 as described with reference to FIG. 7.

At 1410, the method may include receiving, via at least one of the set of multiple downlink occasions and in accordance with the control information, the common portion and a set of multiple private portions, where the set of multiple private portions includes the first private portion and one or more other private portions corresponding to the other UEs. The operations of 1410 may be performed in accordance with examples as disclosed herein. In some examples, aspects of the operations of 1410 may be performed by a data reception component 730 as described with reference to FIG. 7.

At 1415, the method may include receiving the control information via a multicast message for the first UE and at least a second UE of the other UEs. The operations of 1415 may be performed in accordance with examples as disclosed herein. In some examples, aspects of the operations of 1415 may be performed by a multicast reception component 740 as described with reference to FIG. 7.

At 1420, the method may include receiving the control information via a unicast message specific to the first UE. The operations of 1420 may be performed in accordance with examples as disclosed herein. In some examples, aspects of the operations of 1420 may be performed by a unicast reception component 745 as described with reference to FIG. 7.

At 1425, the method may include receiving an activation message after reception of the control information, the activation message activating the semi-persistent communications. The operations of 1425 may be performed in accordance with examples as disclosed herein. In some examples, aspects of the operations of 1425 may be performed by an activation message reception component 755 as described with reference to FIG. 7.

Figure 15:
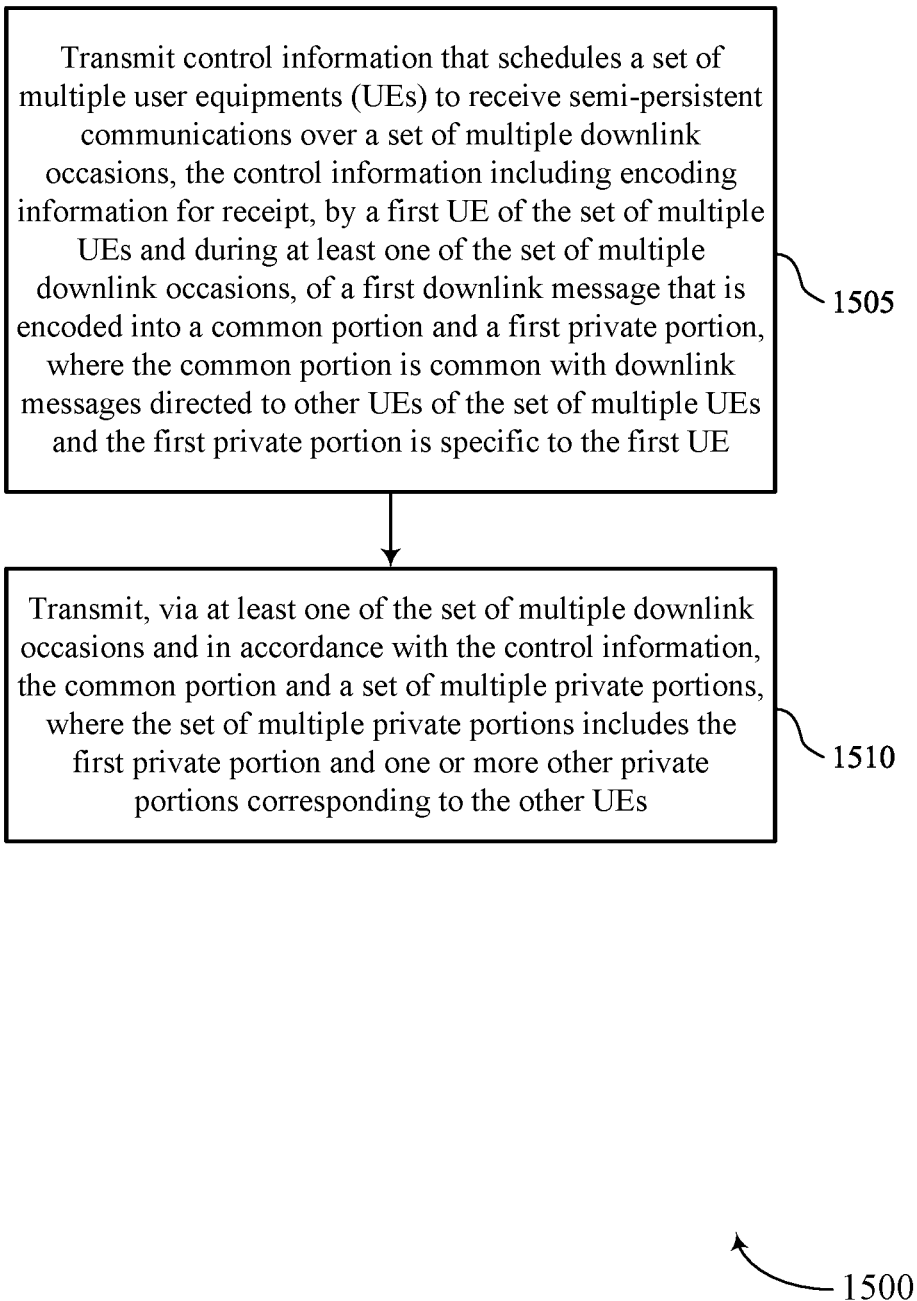

FIG. 15 illustrates a flowchart illustrating a method 1500 that supports semi-persistently scheduled rate-splitting communications in accordance with one or more aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include transmitting control information that schedules a set of multiple UEs to receive semi-persistent communications over a set of multiple downlink occasions, the control information including encoding information for receipt, by a first UE of the set of multiple UEs and during at least one of the set of multiple downlink occasions, of a first downlink message that is encoded into a common portion and a first private portion, where the common portion is common with downlink messages directed to other UEs of the set of multiple UEs and the first private portion is specific to the first UE. The operations of 1505 may be performed in accordance with examples as disclosed herein. In some examples, aspects of the operations of 1505 may be performed by a control information transmission component 1125 as described with reference to FIG. 11.

At 1510, the method may include transmitting, via at least one of the set of multiple downlink occasions and in accordance with the control information, the common portion and a set of multiple private portions, where the set of multiple private portions includes the first private portion and one or more other private portions corresponding to the other UEs. The operations of 1510 may be performed in accordance with examples as disclosed herein. In some examples, aspects of the operations of 1510 may be performed by a data transmission component 1130 as described with reference to FIG. 11.

The following provides an overview of aspects of the present disclosure:

Aspect 1: A method for wireless communication at a first UE, comprising: receiving control information that schedules the first UE to receive semi-persistent communications over a plurality of downlink occasions, the control information including encoding information for receipt, during at least one of the plurality of downlink occasions, of a first downlink message that is encoded into a common portion and a first private portion, wherein the common portion is common with other downlink messages directed to other UEs and the first private portion is specific to the first UE; and receiving, via at least one of the plurality of downlink occasions and in accordance with the control information, the common portion and a plurality of private portions, wherein the plurality of private portions includes the first private portion and one or more other private portions corresponding to the other UEs.

Aspect 2: The method of aspect 1, wherein the control information comprises fallback transmission parameters, the method further comprising: receiving a DCI message indicating that one or more downlink occasions of the plurality of downlink occasions are to be dropped by the first UE, wherein the DCI message is received based at least in part on a first priority level of communications with at least a second UE of the other UEs being higher than a second priority level of the semi-persistent communications; receiving, via the one or more downlink occasions, one or more subsequent downlink messages; and decoding the one or more subsequent downlink messages in accordance with the fallback transmission parameters.

Aspect 3: The method of any of aspects 1 through 2, wherein the control information comprises: a time domain resource allocation for one or more downlink messages, a frequency domain resource allocation for the one or more downlink messages, a periodicity of the one or more downlink messages, a MCS for the one or more downlink messages, or any combination thereof, wherein each downlink message of the one or more downlink messages comprises a respective common portion and a respective plurality of private portions.

Aspect 4: The method of any of aspects 1 through 3, wherein each downlink occasion of a first subset of the plurality of downlink occasions corresponds to a respective non-flexible slot of a plurality of non-flexible slots and each downlink occasion of a second subset of the plurality of downlink occasions corresponds to a respective flexible slot of a plurality of flexible slots, the plurality of non-flexible slots are common to the first UE and the other UEs.

Aspect 5: The method of aspect 4, further comprising: receiving a DCI message comprising a SFI; identifying, based at least in part on one or more bits included in the DCI message, that the first UE, a second UE of the other UEs, or both, is to modify a communication direction of one or more flexible slots; and receiving one or more downlink messages via the one or more flexible slots, wherein the one or more downlink messages are received in accordance with one or more non-rate-splitting parameters.

Aspect 6: The method of aspect 4, further comprising: receiving a DCI message that indicates that, for one or more subsequent downlink occasions, the first UE is to decode one or more corresponding downlink messages in accordance with non-rate-splitting parameters.

Aspect 7: The method of any of aspects 1 through 6, wherein the encoding information is associated with rate-splitting of a plurality of downlink messages for corresponding ones of the first UE and the other UEs, the plurality of downlink messages include the first downlink message.

Aspect 8: The method of any of aspects 1 through 3, wherein each downlink occasion of the plurality of downlink occasions corresponds to a respective non-flexible slot of a plurality of non-flexible slots, the plurality of non-flexible slots are common to the first UE and the other UEs.

Aspect 9: The method of any of aspects 1 through 8, wherein receiving the control information comprises: receiving the control information via a multicast message for the first UE and at least a second UE of the other UEs; or receiving the control information via a unicast message specific to the first UE.

Aspect 10: The method of aspect 9, wherein receiving the common portion and the plurality of private portions comprises: receiving an activation message after reception of the control information, the activation message activating the semi-persistent communications.

Aspect 11: The method of aspect 10, wherein the activation message comprises: a MAC-CE, wherein the MAC-CE is addressed to the first UE and at least the second UE; or a DCI message that is addressed to the first UE and at least the second UE in accordance with a common RNTI.

Aspect 12: A method of wireless communications at a network entity, comprising: transmitting control information that schedules a plurality of UEs to receive semi-persistent communications over a plurality of downlink occasions, the control information including encoding information for receipt, by a first UE of the plurality of UEs and during at least one of the plurality of downlink occasions, of a first downlink message that is encoded into a common portion and a first private portion, wherein the common portion is common with downlink messages directed to other UEs of the plurality of UEs and the first private portion is specific to the first UE; and transmitting, via at least one of the plurality of downlink occasions and in accordance with the control information, the common portion and a plurality of private portions, wherein the plurality of private portions includes the first private portion and one or more other private portions corresponding to the other UEs.

Aspect 13: The method of aspect 12, wherein the control information comprises fallback transmission parameters, the method further comprising: transmitting, to the first UE, a DCI message indicating that one or more downlink occasions of the plurality of downlink occasions are to be dropped by the first UE, wherein the DCI message is received based at least in part on a first priority level of communications with at least a second UE of the other UEs being higher than a second priority level of the semi-persistent communications; and transmitting, via the one or more downlink occasions, one or more subsequent downlink messages.

Aspect 14: The method of any of aspects 12 through 13, wherein the control information comprises: a time domain resource allocation for one or more downlink messages, a frequency domain resource allocation for the one or more downlink messages, a periodicity of the one or more downlink messages, a MCS for the one or more downlink messages, or any combination thereof, wherein each downlink message of the one or more downlink messages comprises a respective common portion and a respective plurality of private portions.

Aspect 15: The method of any of aspects 12 through 14, wherein each downlink occasion of a first subset of the plurality of downlink occasions corresponds to a respective non-flexible slot of a plurality of non-flexible slots and each downlink occasion of a second subset of the plurality of downlink occasions corresponds to a respective flexible slot of a plurality of flexible slots, the plurality of non-flexible slots are common to the first UE and the other UEs.

Aspect 16: The method of aspect 15, further comprising: transmitting a DCI message comprising a SFI and further comprising one or more bits indicating that the first UE, a second UE of the other UEs, or both, is to modify a communication direction of one or more flexible slots; and transmitting one or more downlink messages via the one or more flexible slots, wherein the downlink messages are transmitted in accordance with one or more non-rate-splitting parameters.

Aspect 17: The method of any of aspects 15 through 16, further comprising: transmitting a DCI message that indicates that, for one or more subsequent downlink occasions, the first UE is to decode one or more corresponding downlink messages in accordance with non-rate-splitting parameters.

Aspect 18: The method of any of aspects 12 through 17, wherein the encoding information is associated with rate-splitting of a plurality of downlink messages for corresponding ones of the first UE and the other UEs, the plurality of downlink messages include the first downlink message.

Aspect 19: The method of any of aspects 12 through 14, wherein each downlink occasion of the plurality of downlink occasions corresponds to a respective non-flexible slot of a plurality of non-flexible slots, the plurality of non-flexible slots are common to the first UE and the other UEs.

Aspect 20: The method of any of aspects 12 through 19, wherein transmitting the control information comprises: transmitting the control information via a multicast message for the first UE and at least a second UE of the other UEs; or transmitting the control information via a unicast message specific to the first UE, one or more unicast messages specific to a respective UE of the other UEs, or both.

Aspect 21: The method of aspect 20, wherein transmitting the common portion and the plurality of private portions comprises: transmitting an activation message after reception of the control information, the activation message activating the semi-persistent communications.

Aspect 22: The method of aspect 21, wherein the activation message comprises: a MAC-CE, wherein the MAC-CE is addressed to the first UE and at least the second UE; or a DCI message that is addressed to the first UE and at least the second UE in accordance with a common RNTI.

Aspect 23: An apparatus for wireless communication at a first UE, comprising a processor; memory coupled with the processor; and instructions stored in the memory and executable by the processor to cause the apparatus to perform a method of any of aspects 1 through 11.

Aspect 24: An apparatus for wireless communication at a first UE, comprising at least one means for performing a method of any of aspects 1 through 11.

Aspect 25: A non-transitory computer-readable medium storing code for wireless communication at a first UE, the code comprising instructions executable by a processor to perform a method of any of aspects 1 through 11.

Aspect 26: An apparatus comprising a processor; memory coupled with the processor; and instructions stored in the memory and executable by the processor to cause the apparatus to perform a method of any of aspects 12 through 22.

Aspect 27: An apparatus comprising at least one means for performing a method of any of aspects 12 through 22.

Aspect 28: A non-transitory computer-readable medium storing code the code comprising instructions executable by a processor to perform a method of any of aspects 12 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first user equipment (UE), comprising:
   a processor;
   memory coupled with the processor; and
   instructions stored in the memory and executable by the processor to cause the apparatus to:
   receive control information that schedules the first UE to receive semi-persistent communications over a plurality of downlink occasions, the control information including encoding information for receipt, during at least one of the plurality of downlink occasions, of a first downlink message that is encoded into a common portion and a first private portion, wherein the common portion is common with other downlink messages directed to other UEs and the first private portion is specific to the first UE; and
   receive, via at least one of the plurality of downlink occasions and in accordance with the control information, the common portion and a plurality of private portions, wherein the plurality of private portions includes the first private portion and one or more other private portions corresponding to the other UEs.

2. The apparatus of claim 1, wherein the control information comprises fallback transmission parameters, and the instructions are further executable by the processor to cause the apparatus to:
   receive a downlink control information message indicating that one or more downlink occasions of the plurality of downlink occasions are to be dropped by the first UE, wherein the downlink control information message is received based at least in part on a first priority level of communications with at least a second UE of the other UEs being higher than a second priority level of the semi-persistent communications;
   receive, via the one or more downlink occasions, one or more subsequent downlink messages; and
   decode the one or more subsequent downlink messages in accordance with the fallback transmission parameters.

3. The apparatus of claim 1, wherein the control information comprises:
   a time domain resource allocation for one or more downlink messages, a frequency domain resource allocation for the one or more downlink messages, a periodicity of the one or more downlink messages, a modulation and code scheme for the one or more downlink messages, or any combination thereof, wherein each downlink message of the one or more downlink messages comprises a respective common portion and a respective plurality of private portions.

4. The apparatus of claim 1, wherein each downlink occasion of a first subset of the plurality of downlink occasions corresponds to a respective non-flexible slot of a plurality of non-flexible slots and each downlink occasion of a second subset of the plurality of downlink occasions corresponds to a respective flexible slot of a plurality of flexible slots, and wherein the plurality of non-flexible slots are common to the first UE and the other UEs.

5. The apparatus of claim 4, wherein the instructions are further executable by the processor to cause the apparatus to:
   receive a downlink control information message comprising a slot format indicator;
   identify, based at least in part on one or more bits included in the downlink control information message, that the first UE, a second UE of the other UEs, or both, is to modify a communication direction of one or more flexible slots; and
   receive one or more downlink messages via the one or more flexible slots, wherein the one or more downlink messages are received in accordance with one or more non-rate-splitting parameters.

6. The apparatus of claim 4, wherein the instructions are further executable by the processor to cause the apparatus to:
   receive a downlink control information message that indicates that, for one or more subsequent downlink occasions, the first UE is to decode one or more corresponding downlink messages in accordance with non-rate-splitting parameters.

7. The apparatus of claim 1, wherein the encoding information is associated with rate-splitting of a plurality of downlink messages for corresponding ones of the first UE and the other UEs, and wherein the plurality of downlink messages include the first downlink message.

8. The apparatus of claim 1, wherein each downlink occasion of the plurality of downlink occasions corresponds to a respective non-flexible slot of a plurality of non-flexible slots, and wherein the plurality of non-flexible slots are common to the first UE and the other UEs.

9. The apparatus of claim 1, wherein the instructions to receive the control information are executable by the processor to cause the apparatus to:
receive the control information via a multicast message for the first UE and at least a second UE of the other UEs; or
receive the control information via a unicast message specific to the first UE.

10. The apparatus of claim 9, wherein the instructions to receive the common portion and the plurality of private portions are executable by the processor to cause the apparatus to:
receive an activation message after reception of the control information, the activation message activating the semi-persistent communications.

11. The apparatus of claim 10, wherein the activation message comprises:
a media access control (MAC) control element (MAC-CE), wherein the MAC-CE be addressed to the first UE and at least the second UE; or
a downlink control information message that be addressed to the first UE and at least the second UE in accordance with a common radio network temporary identifier.

12. An apparatus for wireless communications at a network entity, comprising:
a processor;
memory coupled with the processor; and
instructions stored in the memory and executable by the processor to cause the apparatus to:
transmit control information that schedules a plurality of user equipments (UEs) to receive semi-persistent communications over a plurality of downlink occasions, the control information including encoding information for receipt, by a first UE of the plurality of UEs and during at least one of the plurality of downlink occasions, of a first downlink message that is encoded into a common portion and a first private portion, wherein the common portion is common with downlink messages directed to other UEs of the plurality of UEs and the first private portion is specific to the first UE; and
transmit, via at least one of the plurality of downlink occasions and in accordance with the control information, the common portion and a plurality of private portions, wherein the plurality of private portions includes the first private portion and one or more other private portions corresponding to the other UEs.

13. The apparatus of claim 12, wherein the control information comprises fallback transmission parameters, and the instructions are further executable by the processor to cause the apparatus to:
transmit, to the first UE, a downlink control information message indicating that one or more downlink occasions of the plurality of downlink occasions are to be dropped by the first UE, wherein the downlink control information message is received based at least in part on a first priority level of communications with at least a second UE of the other UEs being higher than a second priority level of the semi-persistent communications; and
transmit, via the one or more downlink occasions, one or more subsequent downlink messages.

14. The apparatus of claim 12, wherein control information comprises:
a time domain resource allocation for one or more downlink messages, a frequency domain resource allocation for the one or more downlink messages, a periodicity of the one or more downlink messages, a modulation and code scheme for the one or more downlink messages, or any combination thereof, wherein each downlink message of the one or more downlink messages comprises a respective common portion and a respective plurality of private portions.

15. The apparatus of claim 12, wherein each downlink occasion of a first subset of the plurality of downlink occasions corresponds to a respective non-flexible slot of a plurality of non-flexible slots and each downlink occasion of a second subset of the plurality of downlink occasions corresponds to a respective flexible slot of a plurality of flexible slots, and wherein the plurality of non-flexible slots are common to the first UE and the other UEs.

16. The apparatus of claim 15, wherein the instructions are further executable by the processor to cause the apparatus to:
transmit a downlink control information message comprising a slot format indicator and further comprising one or more bits indicating that the first UE, a second UE of the other UEs, or both, is to modify a communication direction of one or more flexible slots; and
transmit one or more downlink messages via the one or more flexible slots, wherein the downlink messages are transmitted in accordance with one or more non-rate-splitting parameters.

17. The apparatus of claim 15, wherein the instructions are further executable by the processor to cause the apparatus to:
transmit a downlink control information message that indicates that, for one or more subsequent downlink occasions, the first UE is to decode one or more corresponding downlink messages in accordance with non-rate-splitting parameters.

18. The apparatus of claim 12, wherein:
the encoding information is associated with rate-splitting of a plurality of downlink messages for corresponding ones of the first UE and the other UEs, and
the plurality of downlink messages include the first downlink message.

19. The apparatus of claim 12, wherein each downlink occasion of the plurality of downlink occasions corresponds to a respective non-flexible slot of a plurality of non-flexible slots, and wherein the plurality of non-flexible slots are common to the first UE and the other UEs.

20. The apparatus of claim 12, wherein the instructions to transmit the control information are executable by the processor to cause the apparatus to:
transmit the control information via a multicast message for the first UE and at least a second UE of the other UEs; or
transmit the control information via a unicast message specific to the first UE, one or more unicast messages specific to a respective UE of the other UEs, or both.

21. The apparatus of claim 20, wherein the instructions to transmit the common portion and the plurality of private portions are executable by the processor to cause the apparatus to:
  transmit an activation message after reception of the control information, the activation message activating the semi-persistent communications.

22. The apparatus of claim 21, wherein the activation message comprises:
  a media access control (MAC) control element (MAC-CE), wherein the MAC-CE be addressed to the first UE and at least the second UE; or
  a downlink control information message that be addressed to the first UE and at least the second UE in accordance with a common radio network temporary identifier.

23. A method for wireless communication at a first user equipment (UE), comprising:
  receiving control information that schedules the first UE to receive semi-persistent communications over a plurality of downlink occasions, the control information including encoding information for receipt, during at least one of the plurality of downlink occasions, of a first downlink message that is encoded into a common portion and a first private portion, wherein the common portion is common with other downlink messages directed to other UEs and the first private portion is specific to the first UE; and
  receiving, via at least one of the plurality of downlink occasions and in accordance with the control information, the common portion and a plurality of private portions, wherein the plurality of private portions includes the first private portion and one or more other private portions corresponding to the other UEs.

24. The method of claim 23, wherein the control information comprises fallback transmission parameters, the method further comprising:
  receiving a downlink control information message indicating that one or more downlink occasions of the plurality of downlink occasions are to be dropped by the first UE, wherein the downlink control information message is received based at least in part on a first priority level of communications with at least a second UE of the other UEs being higher than a second priority level of the semi-persistent communications;
  receiving, via the one or more downlink occasions, one or more subsequent downlink messages; and
  decoding the one or more subsequent downlink messages in accordance with the fallback transmission parameters.

25. The method of claim 23, wherein the control information comprises:
  a time domain resource allocation for one or more downlink messages, a frequency domain resource allocation for the one or more downlink messages, a periodicity of the one or more downlink messages, a modulation and coding scheme for the one or more downlink messages, or any combination thereof, wherein each downlink message of the one or more downlink messages comprises a respective common portion and a respective plurality of private portions.

26. The method of claim 23, wherein:
  each downlink occasion of a first subset of the plurality of downlink occasions corresponds to a respective non-flexible slot of a plurality of non-flexible slots and each downlink occasion of a second subset of the plurality of downlink occasions corresponds to a respective flexible slot of a plurality of flexible slots, and
  the plurality of non-flexible slots are common to the first UE and the other UEs.

27. A method of wireless communications at a network entity, comprising:
  transmitting control information that schedules a plurality of user equipments (UEs) to receive semi-persistent communications over a plurality of downlink occasions, the control information including encoding information for receipt, by a first UE of the plurality of UEs and during at least one of the plurality of downlink occasions, of a first downlink message that is encoded into a common portion and a first private portion, wherein the common portion is common with downlink messages directed to other UEs of the plurality of UEs and the first private portion is specific to the first UE; and
  transmitting, via at least one of the plurality of downlink occasions and in accordance with the control information, the common portion and a plurality of private portions, wherein the plurality of private portions includes the first private portion and one or more other private portions corresponding to the other UEs.

28. The method of claim 27, wherein the control information comprises fallback transmission parameters, the method further comprising:
  transmitting, to the first UE, a downlink control information message indicating that one or more downlink occasions of the plurality of downlink occasions are to be dropped by the first UE, wherein the downlink control information message is received based at least in part on a first priority level of communications with at least a second UE of the other UEs being higher than a second priority level of the semi-persistent communications; and
  transmitting, via the one or more downlink occasions, one or more subsequent downlink messages.

29. The method of claim 27, wherein the control information comprises:
  a time domain resource allocation for one or more downlink messages, a frequency domain resource allocation for the one or more downlink messages, a periodicity of the one or more downlink messages, a modulation and coding scheme for the one or more downlink messages, or any combination thereof, wherein each downlink message of the one or more downlink messages comprises a respective common portion and a respective plurality of private portions.

30. The method of claim 27, wherein:
  each downlink occasion of a first subset of the plurality of downlink occasions corresponds to a respective non-flexible slot of a plurality of non-flexible slots and each downlink occasion of a second subset of the plurality of downlink occasions corresponds to a respective flexible slot of a plurality of flexible slots, and
  the plurality of non-flexible slots are common to the first UE and the other UEs.

* * * * *